(12) United States Patent
Yamada et al.

(10) Patent No.: US 10,457,244 B2
(45) Date of Patent: Oct. 29, 2019

(54) AIRBAG DEVICE FOR A FRONT PASSENGER SEAT

(71) Applicant: TOYODA GOSEI CO., LTD., Kiyosu-shi, Aichi-ken (JP)

(72) Inventors: Ikuo Yamada, Kiyosu (JP); Takanori Komatsu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 117 days.

(21) Appl. No.: 15/670,552

(22) Filed: Aug. 7, 2017

(65) Prior Publication Data

US 2017/0341618 A1 Nov. 30, 2017

Related U.S. Application Data

(63) Continuation of application No. 14/994,354, filed on Jan. 13, 2016, now Pat. No. 9,758,123.

(30) Foreign Application Priority Data

Jan. 20, 2015 (JP) .................................. 2015-8922

(51) Int. Cl.
*B60R 21/2338* (2011.01)
*B60R 21/231* (2011.01)
(Continued)

(52) U.S. Cl.
CPC .......... *B60R 21/235* (2013.01); *B60R 21/205* (2013.01); *B60R 21/231* (2013.01);
(Continued)

(58) Field of Classification Search
CPC . B60R 21/2338; B60R 21/233; B60R 21/231; B60R 21/205; B60R 2021/23382;
(Continued)

(56) References Cited

U.S. PATENT DOCUMENTS

2006/0186656 A1 8/2006 Kumagi
2013/0001934 A1* 1/2013 Nagasawa ............. B60R 21/233
280/731
2015/0343986 A1 12/2015 Schneider et al.

FOREIGN PATENT DOCUMENTS

JP 02-303951 A 12/1990
JP 08-324373 A 12/1996

* cited by examiner

*Primary Examiner* — Keith J Frisby
(74) *Attorney, Agent, or Firm* — Posz Law Group, PLC

(57) ABSTRACT

An airbag includes on the rear plane a passenger protection portion for protecting a front seat passenger. The passenger protection portion includes a front-collision arresting plane for protecting a head of the passenger as he moves forward in the event of a frontal collision of the vehicle and an oblique-collision arresting plane that is disposed at least either on the left or on the right of the front-collision arresting plane in such a manner as to protrude rearward out of the front-collision arresting plane for protecting the head of the passenger as he moves diagonally forward in the event of an oblique or offset collision of the vehicle. The passenger protection portion further includes an arresting recess that is disposed between the front-collision arresting plane and oblique-collision arresting plane in such a manner as to be sunken forward for receiving and arresting the head of the passenger.

9 Claims, 20 Drawing Sheets

(51) Int. Cl.
   *B60R 21/206*   (2011.01)
   *B60R 21/235*   (2006.01)
   *B60R 21/205*   (2011.01)
   *B60R 21/00*    (2006.01)

(52) U.S. Cl.
   CPC .. *B60R 21/2338* (2013.01); *B60R 2021/0009* (2013.01); *B60R 2021/0048* (2013.01); *B60R 2021/23382* (2013.01); *B60R 2021/23538* (2013.01)

(58) Field of Classification Search
   CPC .. B60R 2021/23308; B60R 2021/0009; B60R 2021/23161; B60R 2021/0048
   USPC ................ 280/732, 729, 730.1, 743.1, 743.2
   See application file for complete search history.

AIRBAG DEVICE FOR A FRONT PASSENGER SEAT

CROSS REFERENCE TO RELATED APPLICATIONS

The present application is a continuation of U.S. patent application Ser. No. 14/994,354 filed on Jan. 13, 2016, which is based upon and claims priority from Japanese Patent Application No. 2015-008922 of Yamada et al., filed on Jan. 20, 2015, the entire disclosure of which is incorporated herein by reference.

BACKGROUND OF THE INVENTION

1. Field of the Invention

The present invention relates to an airbag device for a front passenger seat that is adapted to be mounted on an instrument panel in front of the front passenger seat of a vehicle and includes an airbag which is housed in a housing in a folded-up configuration and is deployable rearward for protecting a passenger when fed with an inflation gas.

2. Description of Related Art

As disclosed in JP H02-303951A and JP H08-324373A, a known airbag device for a front passenger seat includes an airbag which includes a main body for covering the front of a front seat passenger and a protruding section that protrudes rearward from the left or right end region of the rear end region of the main body.

In the conventional airbag device for a front passenger seat, the protruding section is provided for covering the front area of the front seat passenger more broadly in a diagonal direction at airbag deployment. However, the protruding section is an inflatable portion having a gas communication with the main body and is inflatable spherically in a protruding, stepped fashion on the main body. This protruding section may sometimes hit a passenger's head locally when it moves diagonally forward in such an event as an oblique collision, offset collision or the like, which is not a desirable cushioning fashion.

SUMMARY OF THE INVENTION

An object of the present invention is to provide an airbag device for a front passenger seat that is capable of protecting a passenger with its airbag in a smooth fashion when the passenger moves diagonally forward.

The object of the invention will be achieved by an airbag device for a front passenger seat adapted to be mounted on an instrument panel disposed in front of the front passenger seat of a vehicle and including a housing adapted to be disposed in the instrument panel and an airbag which is housed in the housing in a folded-up configuration and deployable rearward for protecting a front seat passenger when fed with an inflation gas. The rear portion of the airbag as deployed serves as a passenger protection portion for protecting the passenger. The passenger protection portion includes:

a front-collision arresting plane that protects a head of the passenger as he moves forward in the event of a frontal collision of the vehicle;

an oblique-collision arresting plane that is disposed at least either on the left or on the right of the front-collision arresting plane in such a manner as to protrude rearward out of the front-collision arresting plane for protecting the head of the passenger as he moves diagonally forward in the event of an oblique collision or an offset collision of the vehicle; and an arresting recess that is disposed between the front-collision arresting plane and oblique-collision arresting plane in such a manner as to be sunken forward for receiving and arresting the head of the passenger.

In the airbag device of the invention, the passenger protection portion of the airbag includes the front-collision arresting plane and the oblique-collision arresting plane which protrudes rearward out of the front-collision arresting plane. The passenger protection portion further includes the arresting recess for receiving and arresting the head of a passenger, and the arresting recess is recessed or sunken forward between the front-collision arresting plane and oblique-collision arresting plane. Accordingly, in the event of an oblique collision or offset collision of the vehicle, the airbag is able to arrest the passenger's head by guiding the head by the oblique-collision arresting plane into the arresting recess as he moves diagonally forward. At this time, at least a part of the passenger's head will thrust itself into the arresting recess while opening the arresting recess toward the left and right, such that the front and laterals of the head will be cushioned by a wide arresting plane composed of inner surfaces of the arresting recess opposed in a left and right direction. Moreover, since the arresting recess will contact both laterals of the passenger's head, it will not turn the passenger's head in a left and right direction when cushioning it. As a consequence, the airbag device of the invention will cushion the passenger's head in a smooth fashion with the arresting recess.

Therefore, the airbag device for a front passenger seat of the invention will protect the front seat passenger with the airbag in a smooth fashion as he moves diagonally forward.

The above airbag device desirably includes a joint region that is formed in a vicinity of each of upper and lower ends of the arresting recess and connects the front-collision arresting plane and oblique-collision arresting plane together. Such a joint region will prevent the rear end of the arresting recess from gaping open at airbag deployment and thus enable the arresting recess to cushion the passenger's head in a receiving fashion while absorbing its kinetic energy in an adequate fashion.

It is further desired that the airbag further includes a regulating tether that is joined to the bottom (leading end) of the arresting recess and prevents the arresting recess from moving rearward at airbag deployment. Such a regulating tether will keep the arresting recess recessed at airbag deployment in an adequate fashion.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
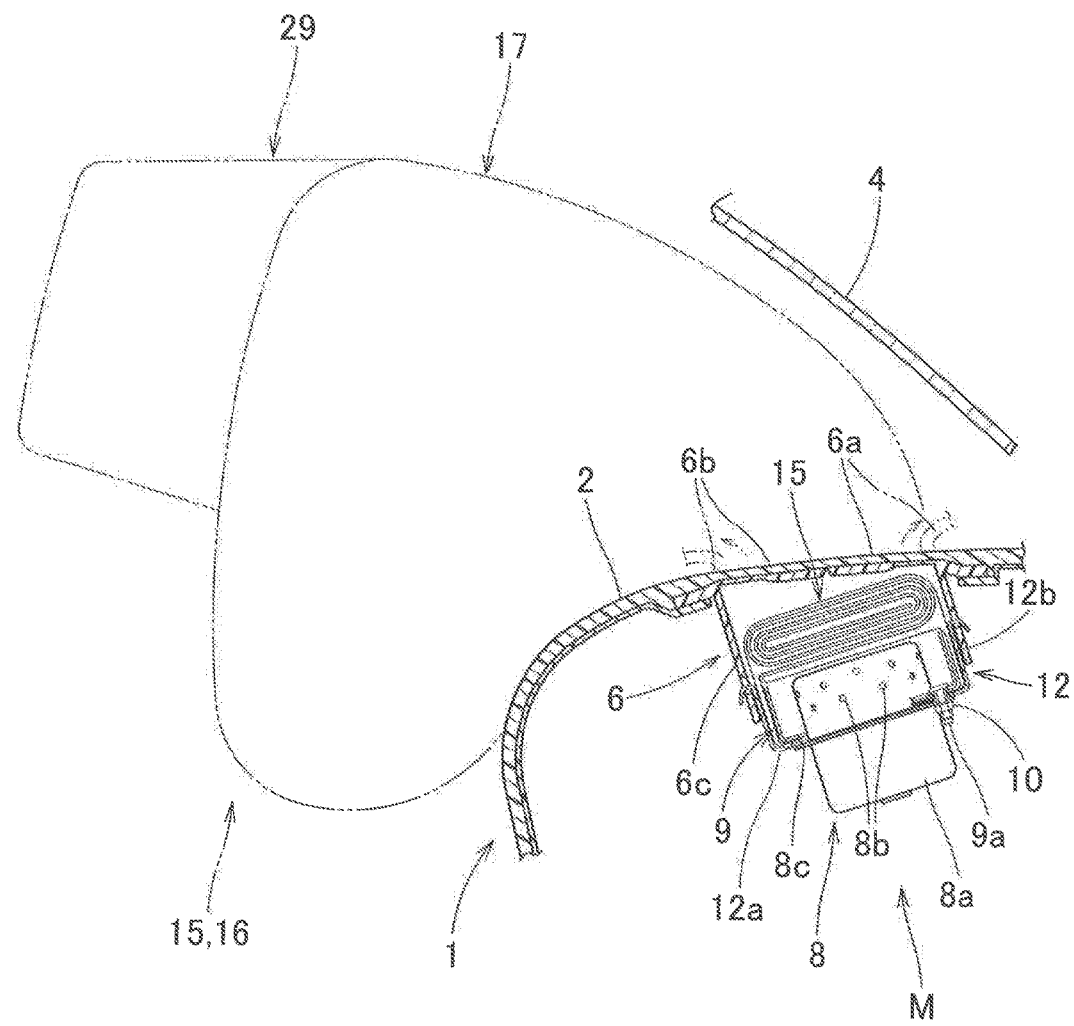
FIG. 1 is a schematic sectional view of an airbag device for a front passenger seat embodying the invention as mounted on a vehicle.
Figure 2:
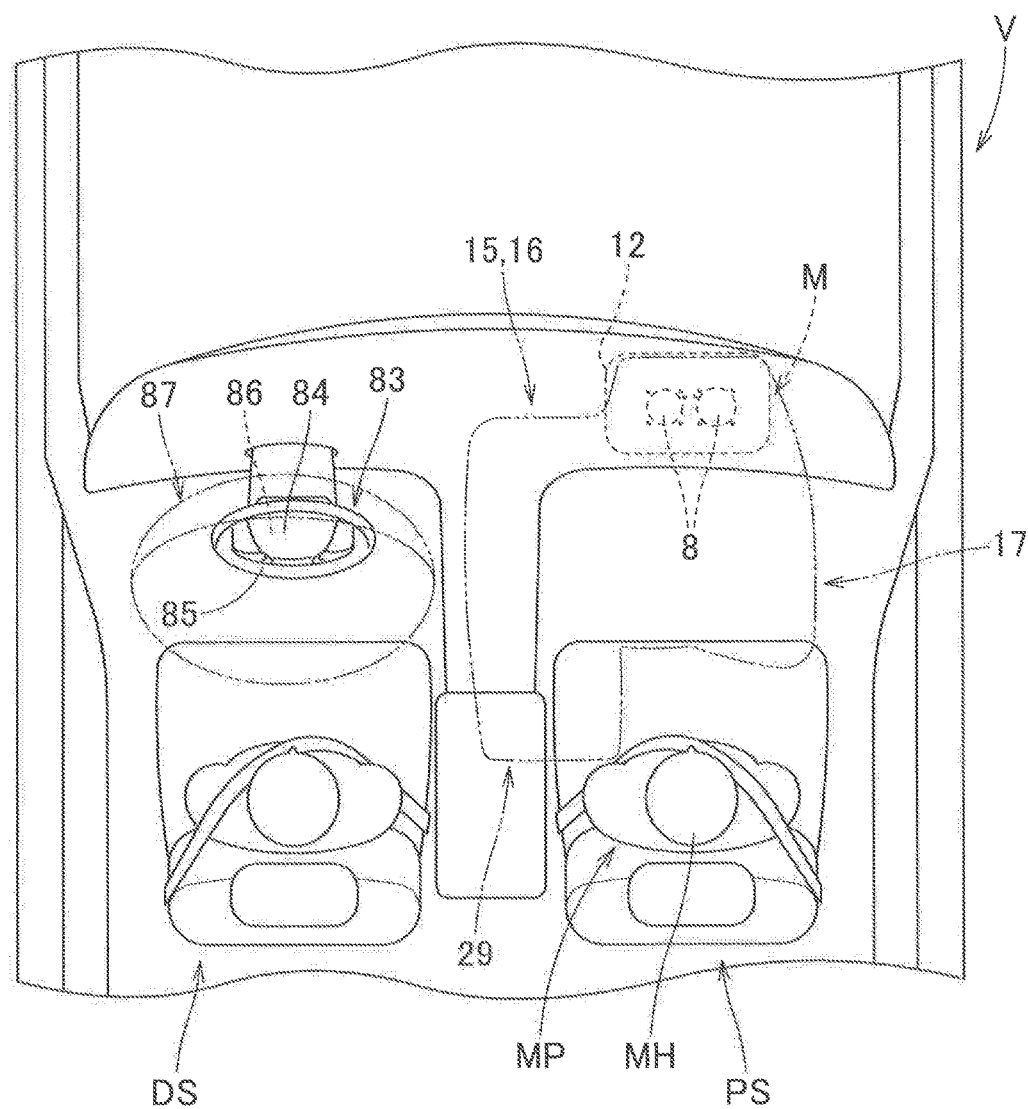
FIG. 2 is a schematic plan view of the airbag device of FIG. 1 as mounted on the vehicle.

As shown in FIGS. 1 and 2, an airbag device M for a front passenger seat embodying the invention is mountable on an instrument panel or dashboard 1 disposed in front of a front passenger seat PS of a vehicle V. Particularly, the airbag device M is a top-mount airbag device mounted inside a top plane 2 of the dashboard 1. Unless otherwise specified, front/rear, up/down and left/right directions in this specification are intended to refer to front/rear, up/down and left/right directions of the vehicle V.

As shown in FIG. 1, the airbag device M includes an airbag 15, two inflators 8 for supplying the airbag 15 with an inflation gas, a case or housing 12 for housing and holding the airbag 15 and inflators 8, two retainers 9 used to mount the airbag 15 and inflators 8 on the case 12 and an airbag cover 6 for covering the airbag 15 from above.

The airbag cover 6 is fabricated of synthetic resin in an integral fashion with the dashboard 1. The airbag cover 6 includes two doors 6a and 6b adapted to open forward and rearward when pushed by the airbag 15 upon airbag deployment. The airbag cover 6 further includes around the doors 6a and 6b a joint wall 6c for joint with the case 12.

Figure 14:
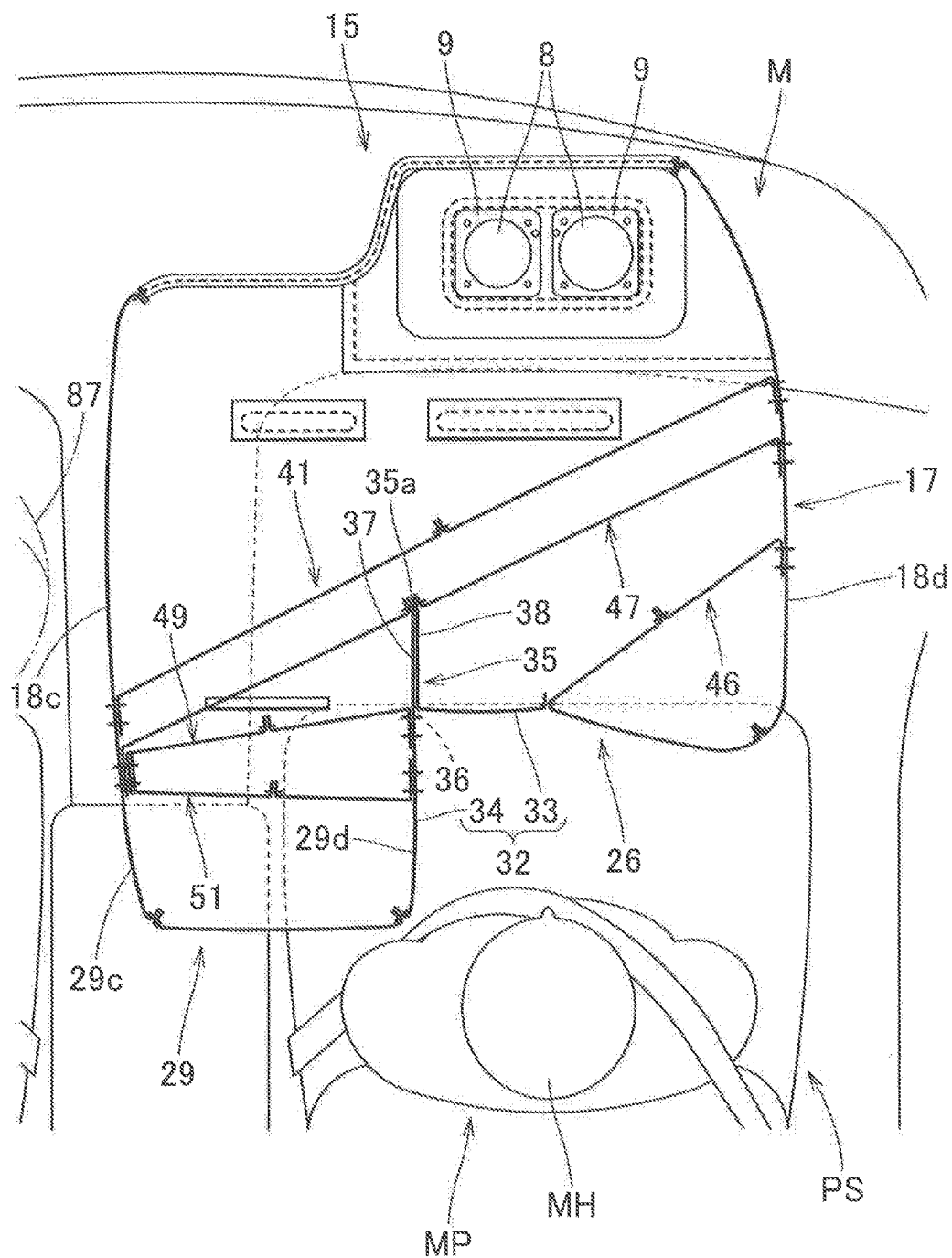
FIG. 14 is a schematic horizontal sectional view of the airbag device of FIG. 1 as the airbag is fully deployed.

The inflators 8 of the illustrated embodiment are disposed side by side in a left and right direction as shown in FIG. 14. As shown in FIG. 1, each of the inflators 8 includes a generally columnar main body 8a provided with a plurality of gas discharge ports 8b and a flange 8c used to mount the inflator 8 on the case 12. The inflators 8 are designed to be actuated in the event of a frontal collision, an oblique collision and an offset collision of the vehicle V.

The case 12 serves as a housing of the airbag 15. The case 12 is made of sheet metal into a generally rectangular parallelepiped provided with a generally rectangular opening at the top, and includes a generally rectangular bottom wall 12a and a circumferential wall 12b extending upward from an outer edge of the bottom wall 12a, as shown in FIG. 1. The inflators 8 are secured to the bottom wall 12a. The circumferential wall 12b is engaged with the joint wall 6c of the airbag cover 6. The airbag 15 and inflators 8 are attached to the bottom wall 12a of the case 12 with the aid of bolts 9a of the retainers 9 stored inside the airbag 15. The bolts 9a are put through peripheral areas of later-described gas inlet ports 21 of the airbag 15, the bottom wall 12a of the case 12 and the flanges 8c of the inflators 8, and then fastened with nuts 10. In the illustrated embodiment, a later-described jointing member 54 of the airbag 15 is jointed to the bottom wall 12a of the case 12 with the aid of the retainer 9 disposed on the left side. The bottom wall 12a is provided with a bracket (not shown) to be mounted on a vehicle body structure.

As shown in FIGS. 3 to 10, the airbag 15 includes a bag body 16 inflatable with an inflation gas, tethers 41, 43, 44, 45, 46, 47, 49 and 51 disposed inside the bag body 16 for regulating a contour of the bag body 16 as inflated and a jointing member 54 that joints a front end region of the bag body 16 as inflated to a vicinity of the case 12.

The bag body 16 is made of a flexible sheet material, and includes, in the illustrated embodiment, a main inflatable region 17 and a protruding inflatable region 29 protruding rearward out of the rear plane of the main inflatable region 17, as shown in FIGS. 3 to 10.

Figure 3:
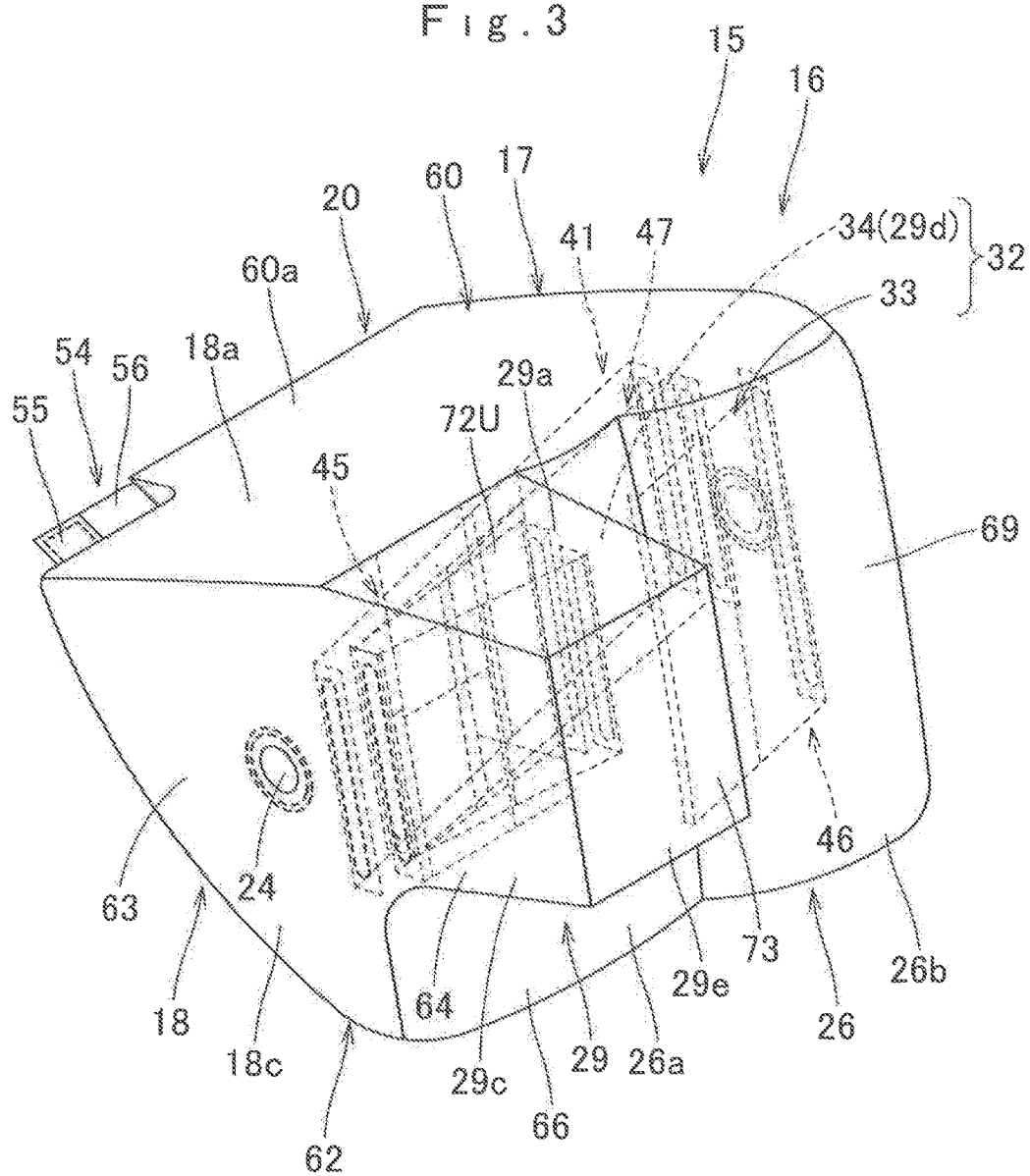
FIG. 3 is an upper left rear perspective view of an airbag for use in the airbag device of FIG. 1 as deployed by itself.
Figure 4:
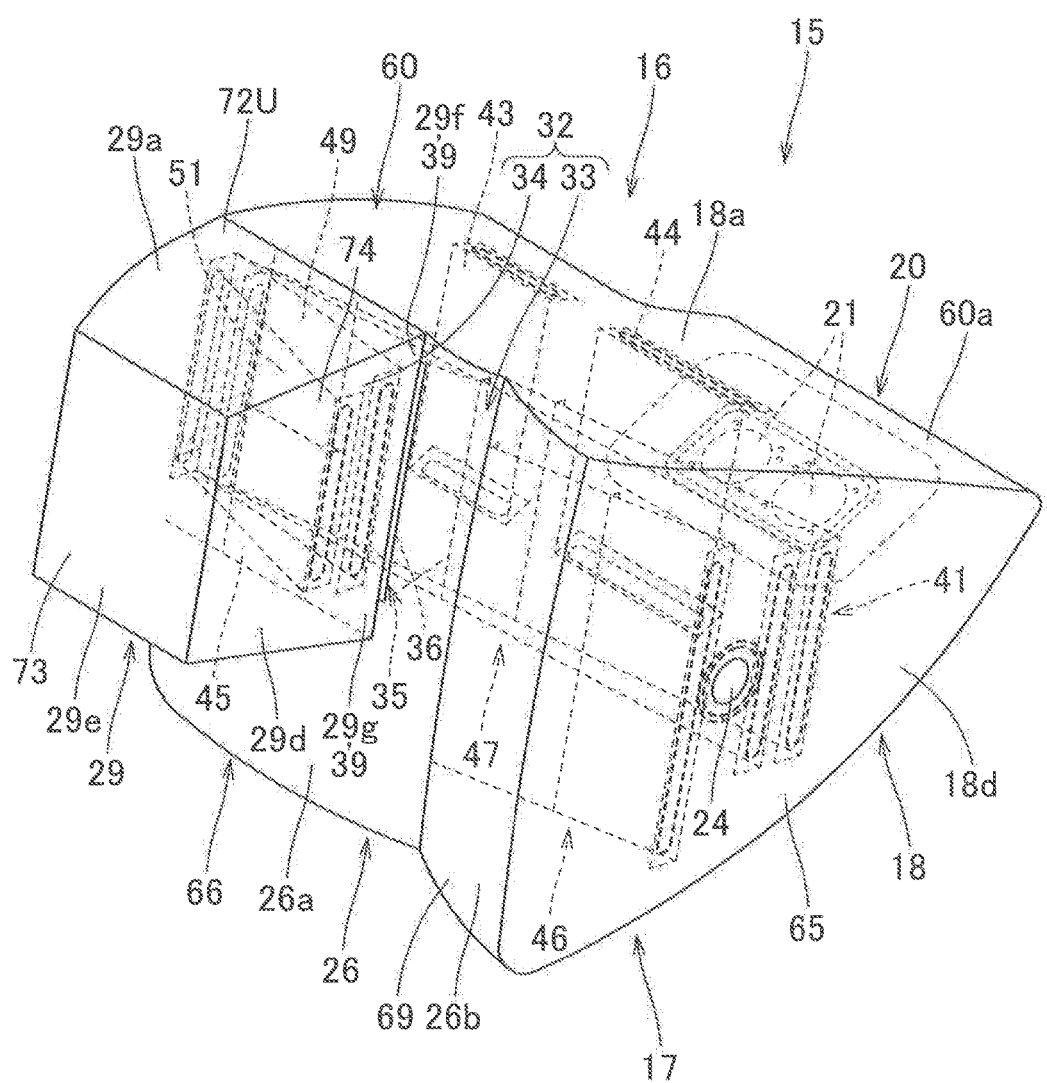
FIG. 4 is an upper right rear perspective view of the airbag of FIG. 3.
Figure 5:
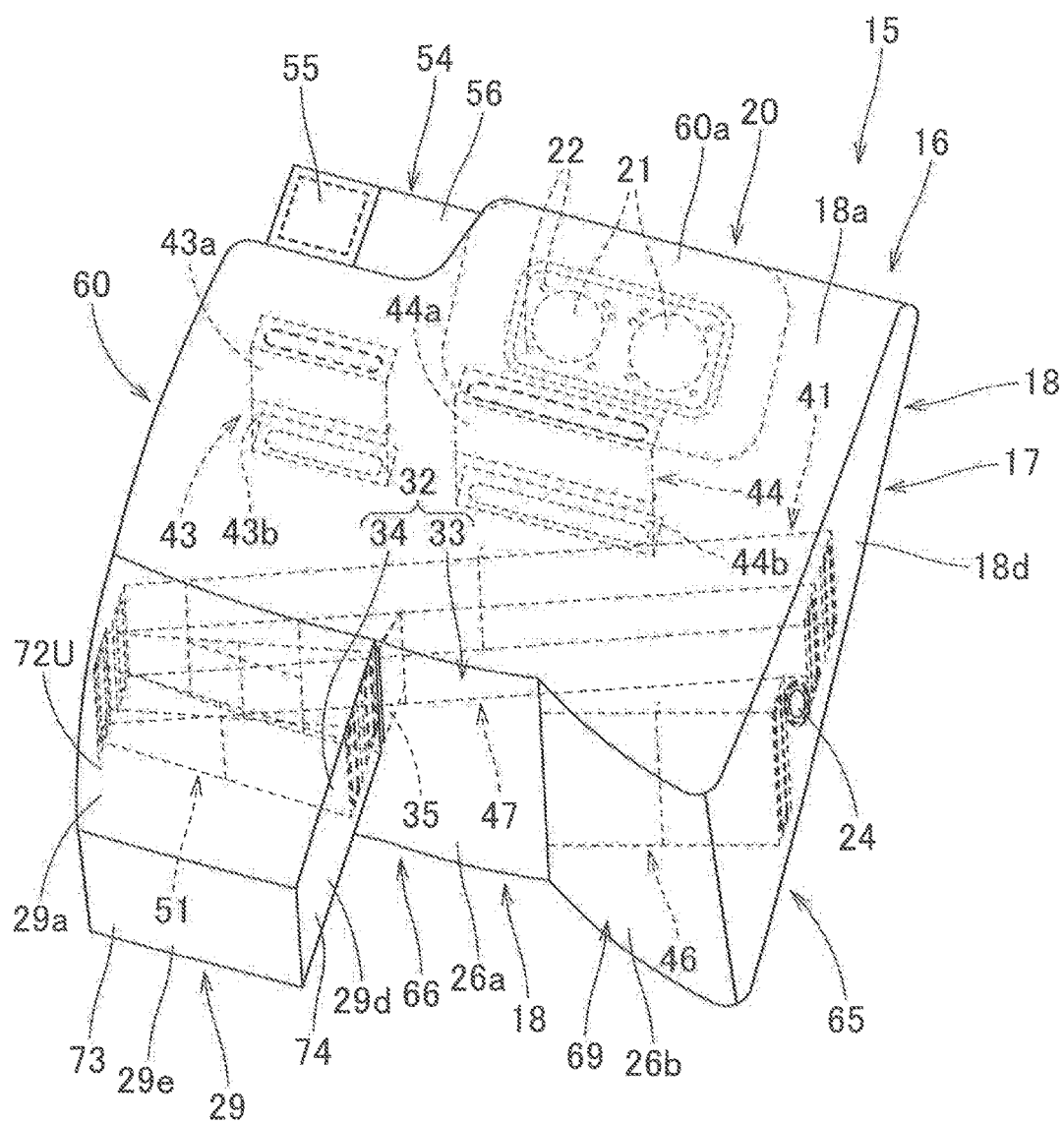
FIG. 5 is an upper perspective view of the airbag of FIG. 3.
Figure 16:
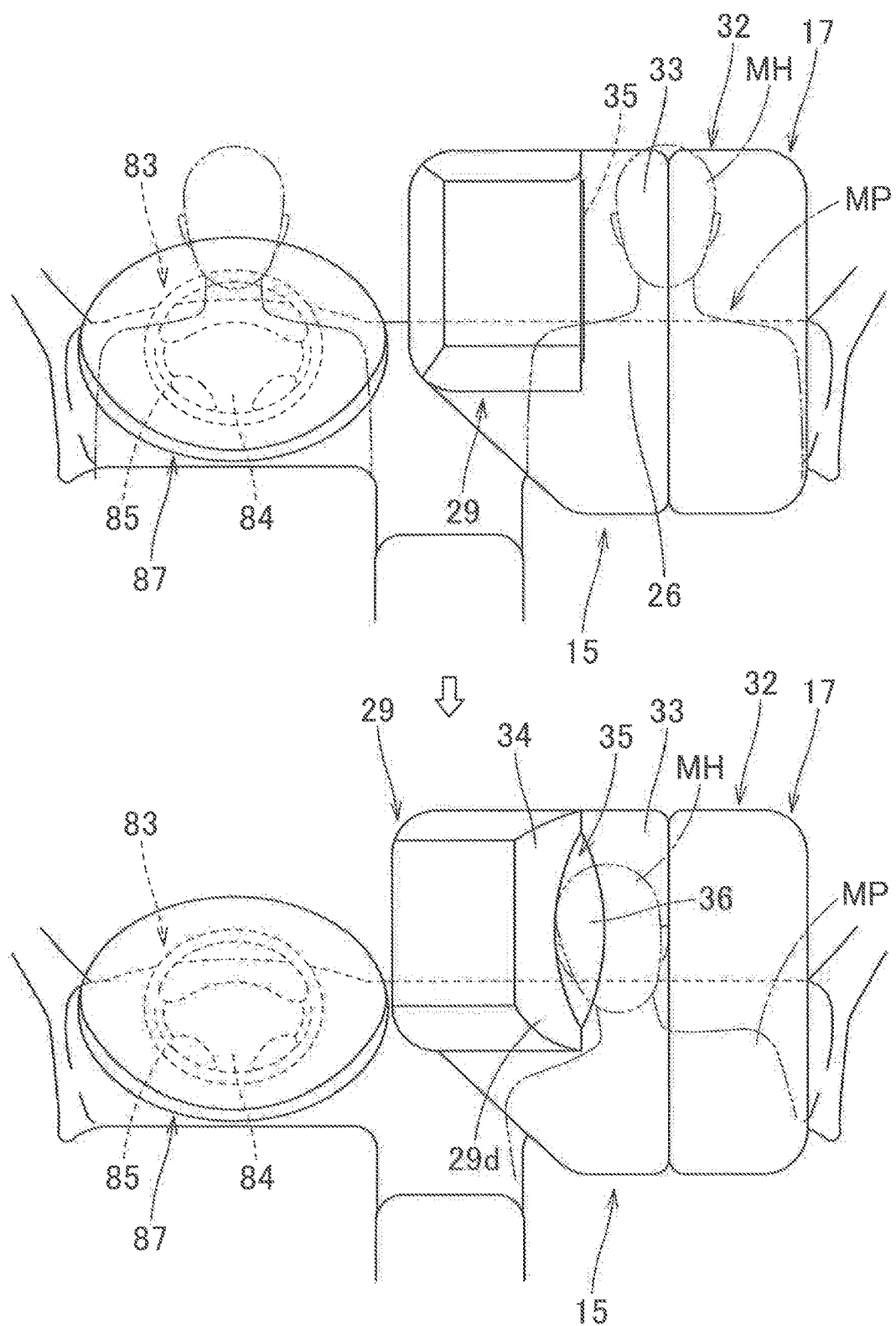
FIG. 16 shows schematic front views of the airbag device before and after the airbag as fully deployed cushions the passenger.

The main inflatable region 17 is designed to be deployed in such a manner as to fill up a space between the top plane 2 of the dashboard 1 and a windshield 4 disposed above the dashboard 1, as indicated with double-dotted lines in FIG. 1. More specifically, as shown in FIGS. 3 to 5, the outer contour of the main inflatable region 17 as fully inflated is a generally triangular prism extending in a left and right direction. The main inflatable region 17 includes a mounting section 20 at the right front end region as deployed, at which mounting section 20 the main inflatable region 17 is mounted on the case 12. That is, the main inflatable region 17 is mounted on the case 12 by the right front end region and protrudes towards the left (i.e., towards the driver's seat DS) considerably at airbag deployment, as shown in FIGS. 14 and 16. The main inflatable region 17 includes a rear wall 26 deployable at the rear to face a front seat passenger MP and a circumferential wall 18 which extends forward from a peripheral edge of the rear wall 26 while narrowing forward in dimension in an up and down direction.

Figure 8:
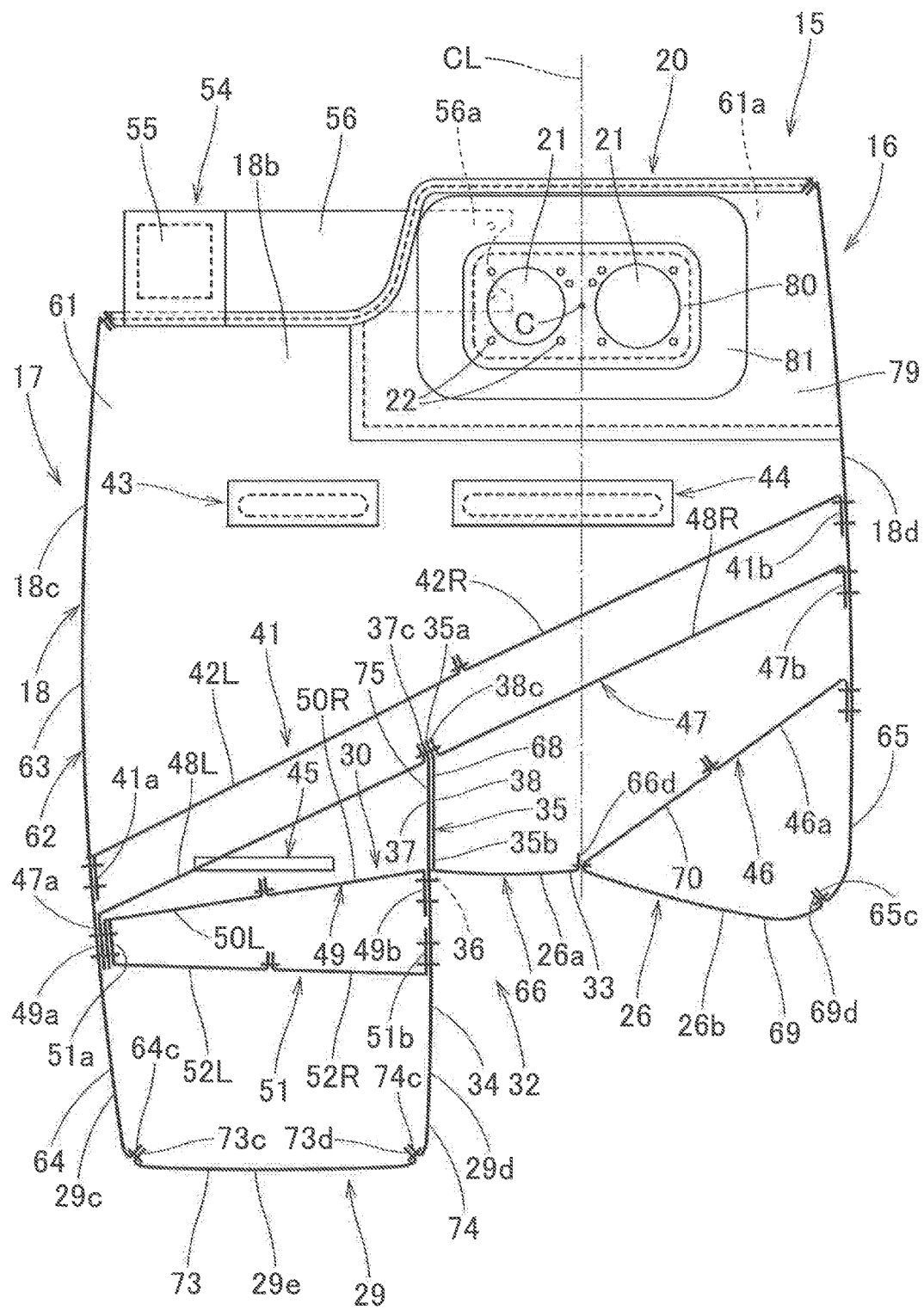
FIG. 8 is a schematic horizontal section of the airbag of FIG. 3.

The circumferential wall 18 is a portion deployable mainly in such a manner as to fill up the space between the top plane 2 of the dashboard 1 and the windshield 4, and includes an upper wall 18a and a lower wall 18b deployable at the upper side and lower side in such a manner as to extend generally along a left and right direction, and a left side wall 18c and a right side wall 18d deployable on the left side and right side in such a manner as to extend generally along a front and rear direction. At the right front end region of the circumferential wall 18 as deployed is the mounting section 20 to be attached to the case 12. As shown in FIGS. 4 and 5, the mounting section 20 is so formed as to protrude forward in the airbag 15 as deployed. The mounting section 20 stays inside the case 12 at airbag deployment. The mounting section 20 is provided, on the underside as deployed (i.e., on the lower wall 18b), with two round inlet ports 21 for admitting an inflation gas. The inlet ports 21 are disposed side by side in a left and right direction corresponding to the two inflators 8. In a peripheral area of each of the inlet ports 21 are a plurality of (four, in the illustrated embodiment) mounting holes 22 for receiving the bolts 9a of the retainers 9, which are used to attach the peripheral area to the bottom wall 12a of the case 12. The airbag device M of the illustrated embodiment is so designed that the center in a left and right direction of the mounting section 20 (i.e., the center of a space between the centers of the gas inlet ports 21) coincides with the center in a left and right direction of the front passenger seat PS when the airbag device M is mounted on the vehicle V, as shown in FIG. 14. The center in a left and right direction of the mounting section 20 will be called hereinafter a mounting center C (FIG. 8). Each of the left side wall 18c and right side wall 18d of the circumferential wall 18 is provided with a vent hole 24 for releasing an extra inflation gas.

As shown in FIG. 8, the main inflatable region 17 is so designed that a region deployable on the left side of a center line CL which runs through the mounting center C and extends in a front and rear direction is greater than a region deployable on the right side of the center line CL so as to bulge more toward the left (i.e., toward the driver's seat DS) than toward the right at airbag deployment. At airbag deployment, the left side wall 18c of the circumferential wall 18 deployable toward the driver's seat DS is deployed proximate a later-described airbag 87 deployed over a steering wheel 83 (FIG. 14).

Figure 6:
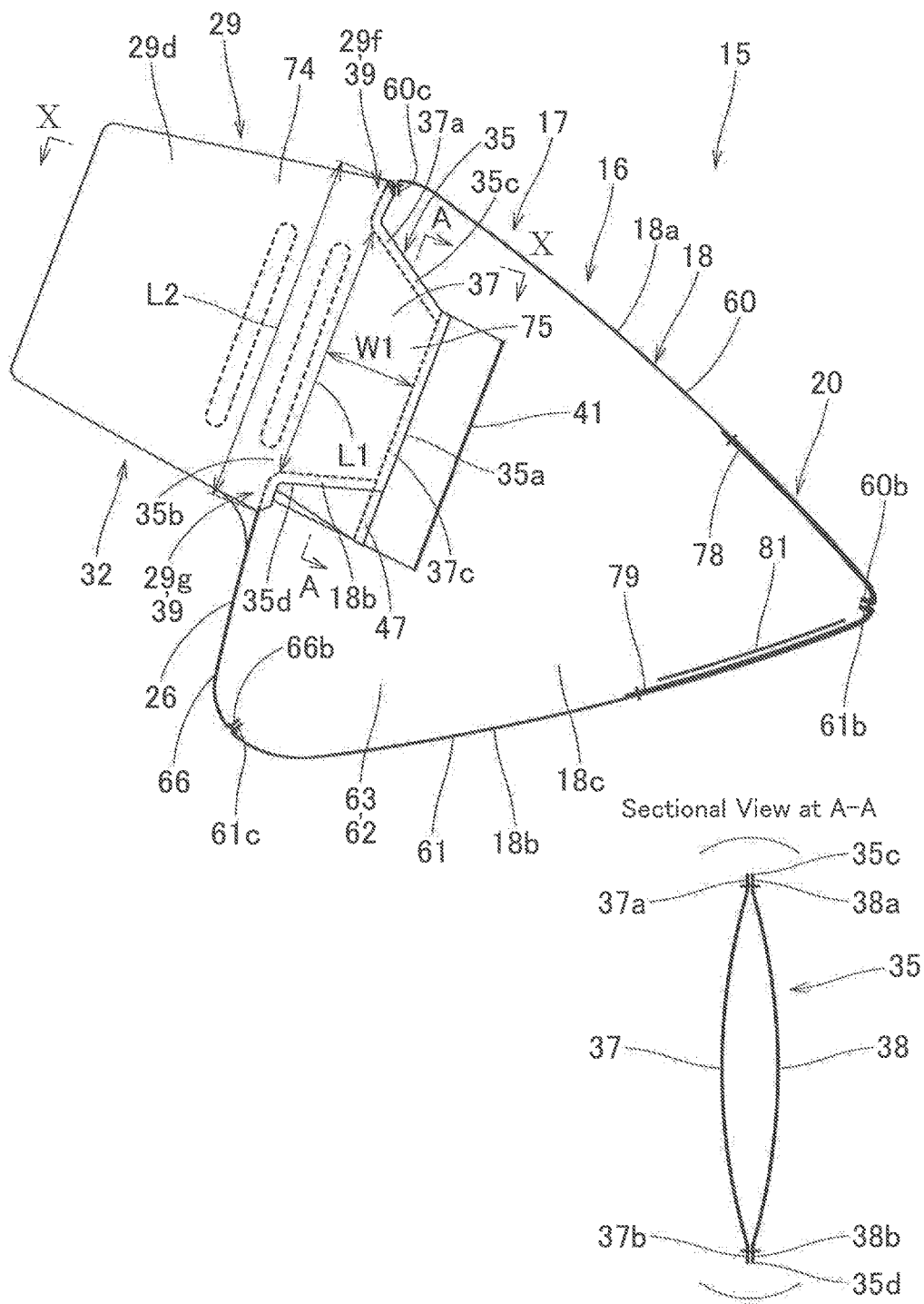
FIG. 6 is a schematic vertical section of the airbag of FIG. 3 taken at a location of an arresting recess.
Figure 7:
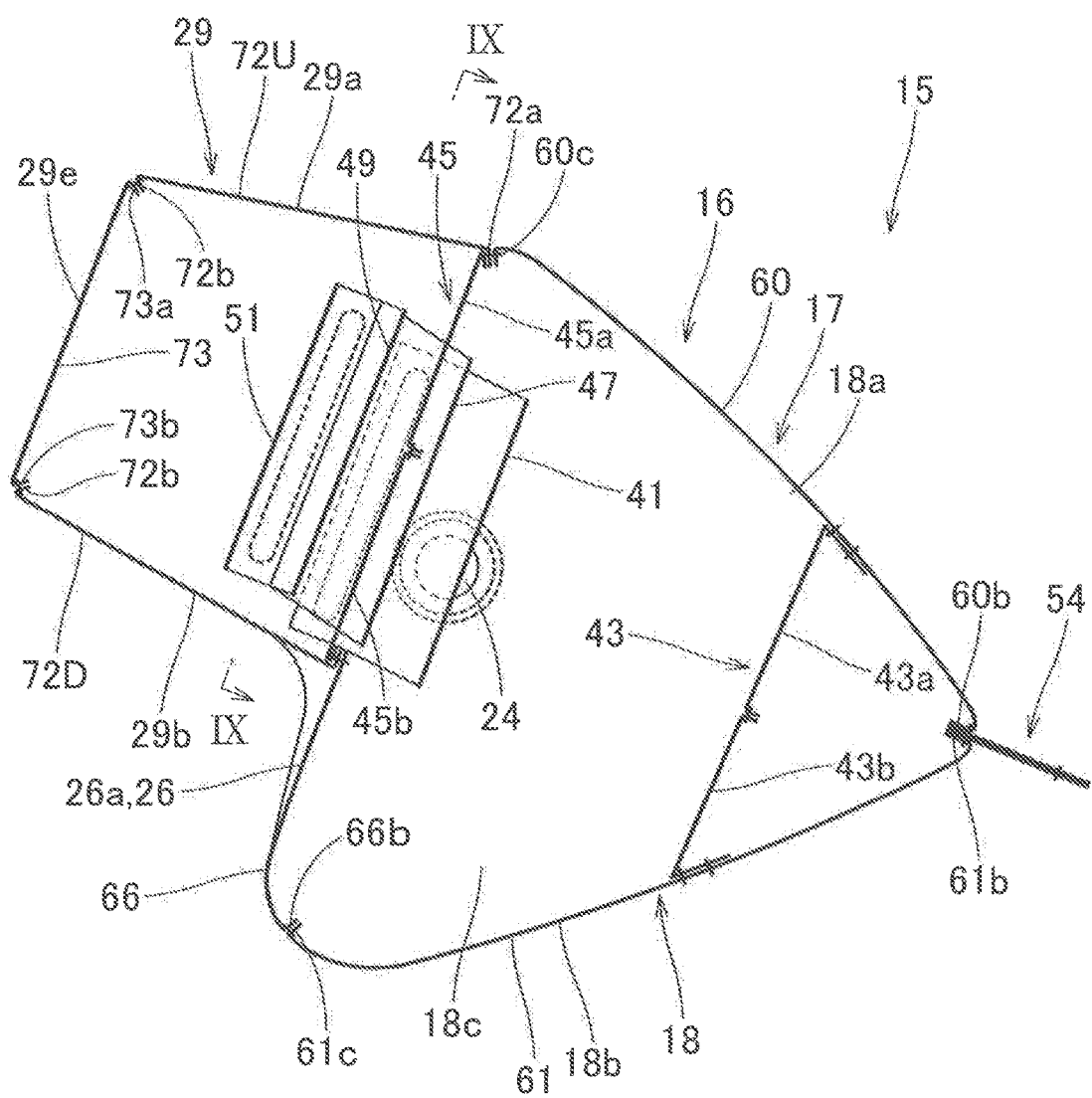
FIG. 7 is a schematic vertical section of the airbag of FIG. 3 taken at a location of a protruding inflatable region.

The rear wall 26 is deployable generally along an up and down direction on the rear plane facing towards the passenger MP. As shown in FIGS. 6 and 7, the rear wall 26 of the illustrated embodiment is so deployable slightly at a slant relative to the up and down direction that the lower end is disposed farther rearward relative to the upper end. In a horizontal section taken along a front and rear direction at airbag deployment, the rear wall 26 extends generally along a left and right direction. More specifically, a left region 26a of the rear wall 26 which is disposed on the left side of the center line CL extends generally along a left and right direction while a right region 26b of the rear wall 26 disposed on the right side of the center line CL extends slightly at a slant relative to the left and right direction such that the right end is disposed farther rearward than the left end as shown in FIG. 8. As shown in FIGS. 3 to 5 and 8, the protruding inflatable region 29 is disposed in the left region 26a of the rear wall 26 as deployed in a rearwardly protruding fashion. More particularly, the protruding inflatable region 29 is located at the left upper region of the rear wall 26 as deployed so as to be deployed diagonally forward left of the head MH of the front seat passenger MP as shown in FIG. 14.

Figure 9:
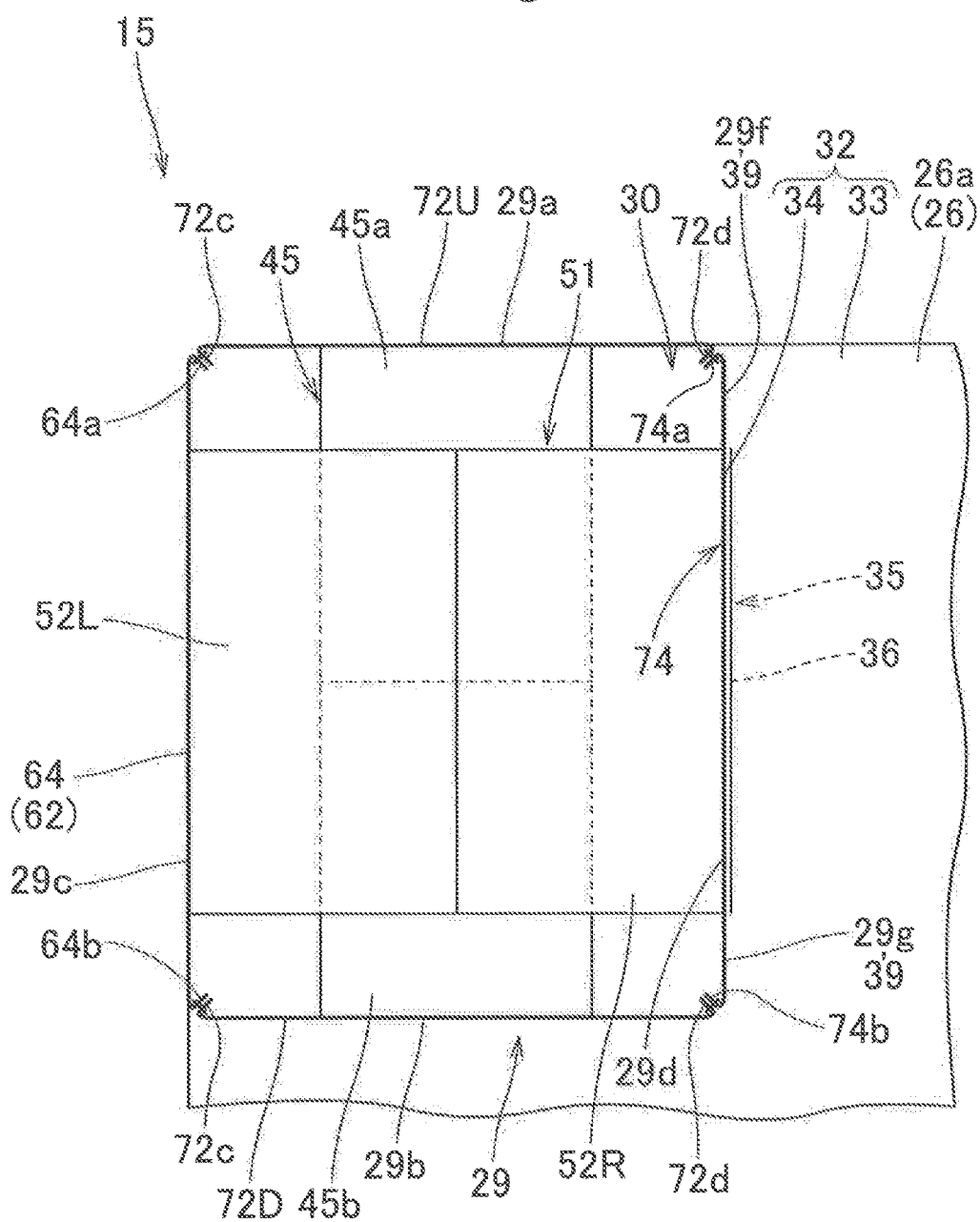
FIG. 9 is a sectional view taken along line IX-IX of FIG. 7.

The protruding inflatable region 29 is in gas communication with the main inflatable region 17 by a communication portion 30 disposed at the front end as shown in FIGS. 8 and 9 so as to admit an inflation gas from the main inflatable region 17. The protruding inflatable region 29 includes an upper wall 29a and a lower wall 29b deployable at the upper side and lower side in such a manner as to extend generally along a left and right direction, a left side wall 29c and a right side wall 29d deployable on the left side and right side in such a manner as to extend generally along a front and rear direction, and a rear wall 29e deployable generally along an up and down direction at the rear. In the illustrated embodiment, the upper wall 29a is continuous with the upper wall 18a of the circumferential wall 18 of the main inflatable region 17 as shown in FIG. 7 while the left side wall 29c is continuous with the left side wall 18c of the circumferential wall 18 of the main inflatable region 17 as shown in FIG. 8.

As shown in FIG. 8, the protruding inflatable region 29 is disposed on the left side of (i.e., on a side towards the driver's seat DS relative to) the center line CL running through the mounting center C and extending in a front and rear direction, in a horizontal section of the airbag 15 taken along a front and rear direction at airbag deployment. In the illustrated embodiment, the width in a left and right direction of the protruding inflatable region 29 as inflated is about half of that of the main inflatable region 17. The dimension in an up and down direction of the protruding inflatable region 29 is such as to protect the head MH of the passenger MP in an adequate fashion when it moves diagonally forward in the event of an oblique collision or an offset collision of the vehicle V. More particularly, the dimension in an up and down direction of the protruding inflatable region 29 is greater than a length L1 (FIG. 6) in an up and down direction of a later-described arresting recess 35 and about three fifths of a width in an up and down direction of the rear wall 26 of the main inflatable region 17 in the vicinity of the protruding inflatable region 29. In the illustrated embodiment, the protruding inflatable region 29 protrudes farther rearward than the airbag 87 for the steering wheel 83 as deployed, at deployment of the airbag 15, as indicated by double-dotted lines in FIG. 2.

In the airbag 15, the protruding inflatable region 29 and the rear wall 26 of the main inflatable region 17 form a passenger protection portion 32 for protecting the passenger MP. The passenger protection portion 32 includes a front-collision arresting plane 33 for protecting the head MH of the passenger MP in the event of a frontal collision of the vehicle V at which he moves forward and an oblique-collision arresting plane 34 for protecting the head MH of the passenger MP in the event of an oblique collision or offset collision of the vehicle V at which he moves diagonally forward. There is provided an arresting recess 35 between the front-collision arresting plane 33 and the oblique-collision arresting plane 34 for receiving and arresting the head MH of the passenger MP.

In the illustrated embodiment, the front-collision arresting plane 33 is composed of an upper region of the rear wall 26, disposed on the right side of the protruding inflatable region 29 as deployed. That is, the front-collision arresting plane 33 includes a region extending farther to the left of the center line CL (towards the driver's seat DS) so as to protect the head MH of the passenger MP smoothly when it moves forward in the event of a frontal collision. In a horizontal section of the airbag 15 as deployed taken along a front and rear direction, a left region of the front-collision arresting plane 33 extends generally along a left and right direction while a right region of the front-collision arresting plane 33 extends slightly at a slant relative to the left and right direction such that the right end is disposed farther rearward than the left end.

The oblique-collision arresting plane 34 is composed of the right side wall 29d of the protruding inflatable region 29. That is, the oblique-collision arresting plane 34 is disposed only on the left side of the front-collision arresting plane 33 (i.e., on the side towards the driver's seat DS). The oblique-collision arresting plane 34 extends generally along a front and rear direction at airbag deployment. The lower region of the rear wall 26 of the airbag 15 is to catch mainly the thorax of the passenger MP when the passenger protection portion 32 arrests the head MH of the occupant MP.

Figure 10:
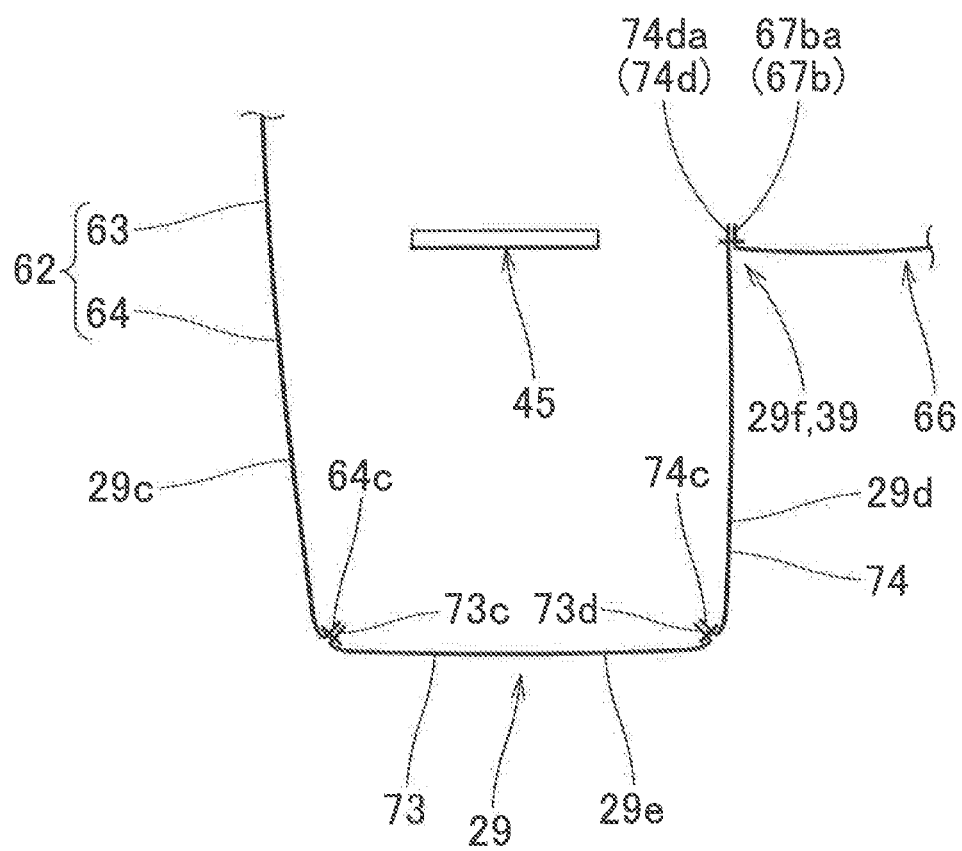
FIG. 10 is a sectional end view taken along line X-X of FIG. 6.
Figure 11:
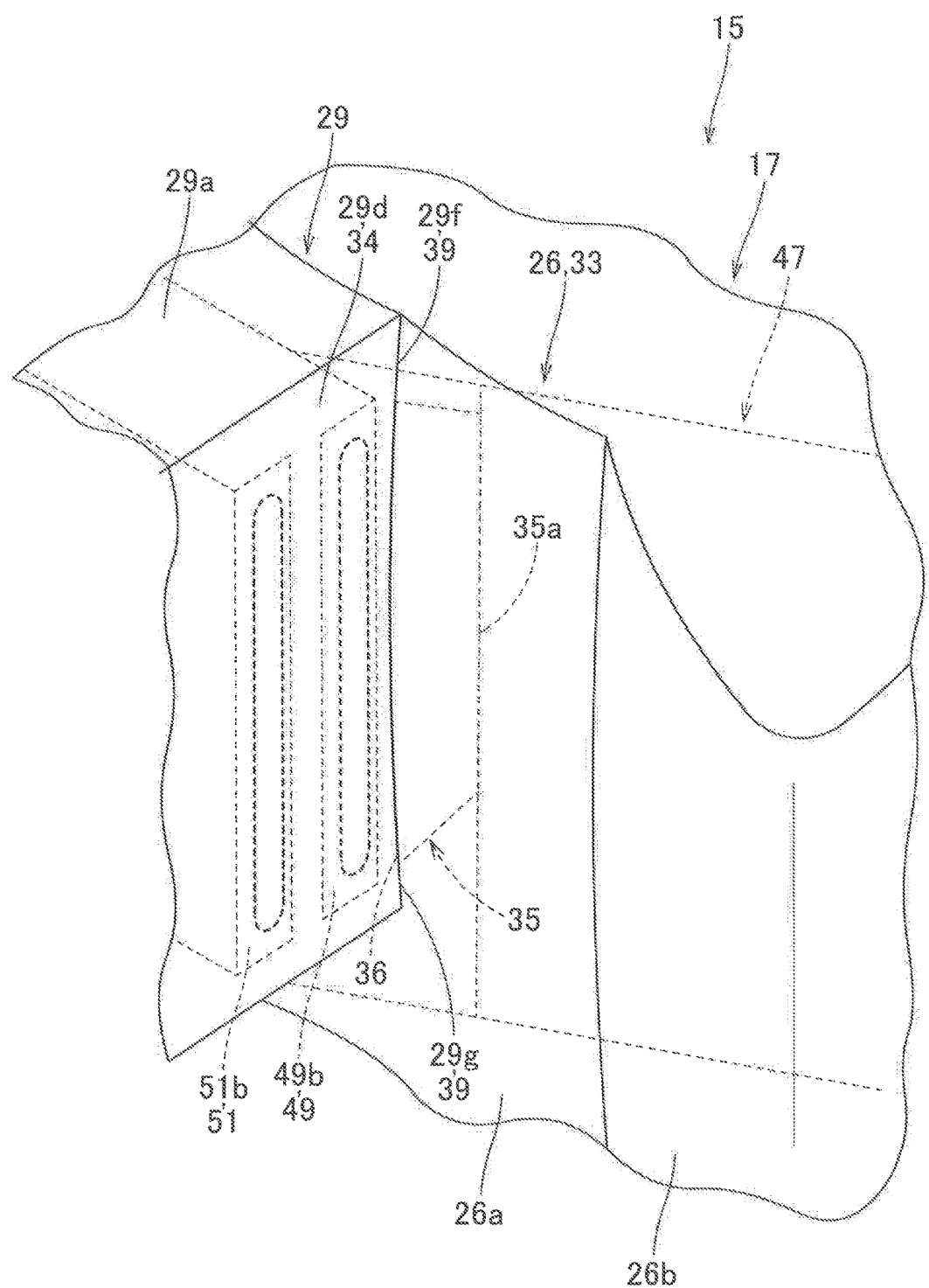
FIG. 11 is a partial enlarged perspective view of a vicinity of the arresting recess in the airbag of FIG. 3.

The arresting recess 35 formed between the front-collision arresting plane 33 and oblique-collision arresting plane 34 is provided for receiving and arresting the head MH of the passenger MP. In the illustrated embodiment, as shown in FIGS. 4 and 11, the arresting recess 35 is formed generally along an up and down direction at the boundary between a right region of the protruding inflatable region 29 and the rear wall 26 of the main inflatable region 17, in such a manner as to be sunken forward like a pocket such that the rear end 35b is open, as shown in FIGS. 6 and 8. In other words, the arresting recess 35 is closed at the upper and lower ends. More specifically, the arresting recess 35 is formed into a pocket opening at the rear end 35b by joining (sewing) upper ends 37a and 38a, lower ends 37b and 38b and front ends 37c and 38c together, of generally trapezoidal left side wall 37 and right side wall 38, whose bases are positioned at the rear edges 37d and 38d (at the opening 36) as viewed from a left and right direction, as shown in FIGS. 6 and 8. That is, the arresting recess 35 slightly tapers toward the front end 35a (i.e., toward the leading end or bottom of the recess). The arresting recess 35 has such a length L1 in an up and down direction at the rear end 35b (at the opening 36) as to admit a passenger's head MH smoothly. More specifically, the length L1 in an up and down direction of the rear end 35b (the opening 36) of the arresting recess 35 is about 400 mm, which is smaller than a length L2 (FIG. 6) in an up and down direction of a front end region (or root region) of the protruding inflatable region 29. A dimension in a front and rear direction (depth) W1 (FIG. 6) of the arresting recess 35 is about 50 to 100 mm, which is enough to accommodate a front region of the passenger's head MH. The arresting recess 35 is so formed that the center in an up and down direction generally coincides with that of the protruding inflatable region 29. In other words, as shown in FIGS. 6 and 11, the protruding inflatable region 29 includes proximate to each of the upper edge 35c and 35d a protruding region 29f/29g which protrudes outwardly in an up and down direction. Each of the protruding regions 29f and 29g of the protruding inflatable region 29 is jointed to the rear wall 26 of the main inflatable region 17 at the upper side and lower side of the arresting recess 35. Each of the protruding regions 29f and 29g serves as a joint region 39 that is formed in a vicinity of the upper end 35c/lower end 35d of the arresting recess 35 and connects the protruding inflatable region 29 and rear wall 26 (i.e., the front-collision arresting plane 33 and oblique-collision arresting plane 34) together, as shown in FIGS. 6, 10 and 11.

In the illustrated embodiment, the leading end (bottom of front end 35a) of the arresting recess 35 is joined to a later-described regulating tether 47 disposed inside the bag body 16, which pulls the leading end of the arresting recess 35 forward at airbag deployment. As shown in FIG. 8, by pulling forward, the regulating tether 47 helps deploy the arresting recess 35 generally along a front and rear direction at airbag deployment. More particularly, an entire area in an up and down direction of the leading end (front end or bottom 35a) of the arresting recess 35 is jointed to the regulating tether 47. When the regulating tether 47 pulls the bottom of the arresting recess 35 forward at airbag deployment, the arresting recess 35 is deployed in such a manner as to extend, i.e., be sunken forward, from the right side wall 29d of the protruding inflatable region 29, generally perpendicularly to the rear wall 26. The left side wall 37 and right side wall 38 are brought in contact with each other and thus the arresting recess 35 is held from gaping open at the rear end 35b (at the opening 36).

As shown in FIGS. 3 to 10, the bag body 16 internally includes tethers 41, 43, 44, 45, 46, 47, 49 and 51. Specifically, a left-right tether 41 and two up-down tethers 43 and 44 are disposed in the main inflatable region 17, and a regulating tether 45 is disposed in a vicinity of the communication portion 30 in the front end region of the protruding inflatable region 29. A regulating tether 46 is disposed in the passenger protection portion 32 of the main inflatable region 17, and two left-right tethers 49 and 51 are disposed inside the protruding inflatable region 29. As described above, the regulating tether 47 regulates the contour of the arresting recess 35 at airbag deployment.

Figure 15:
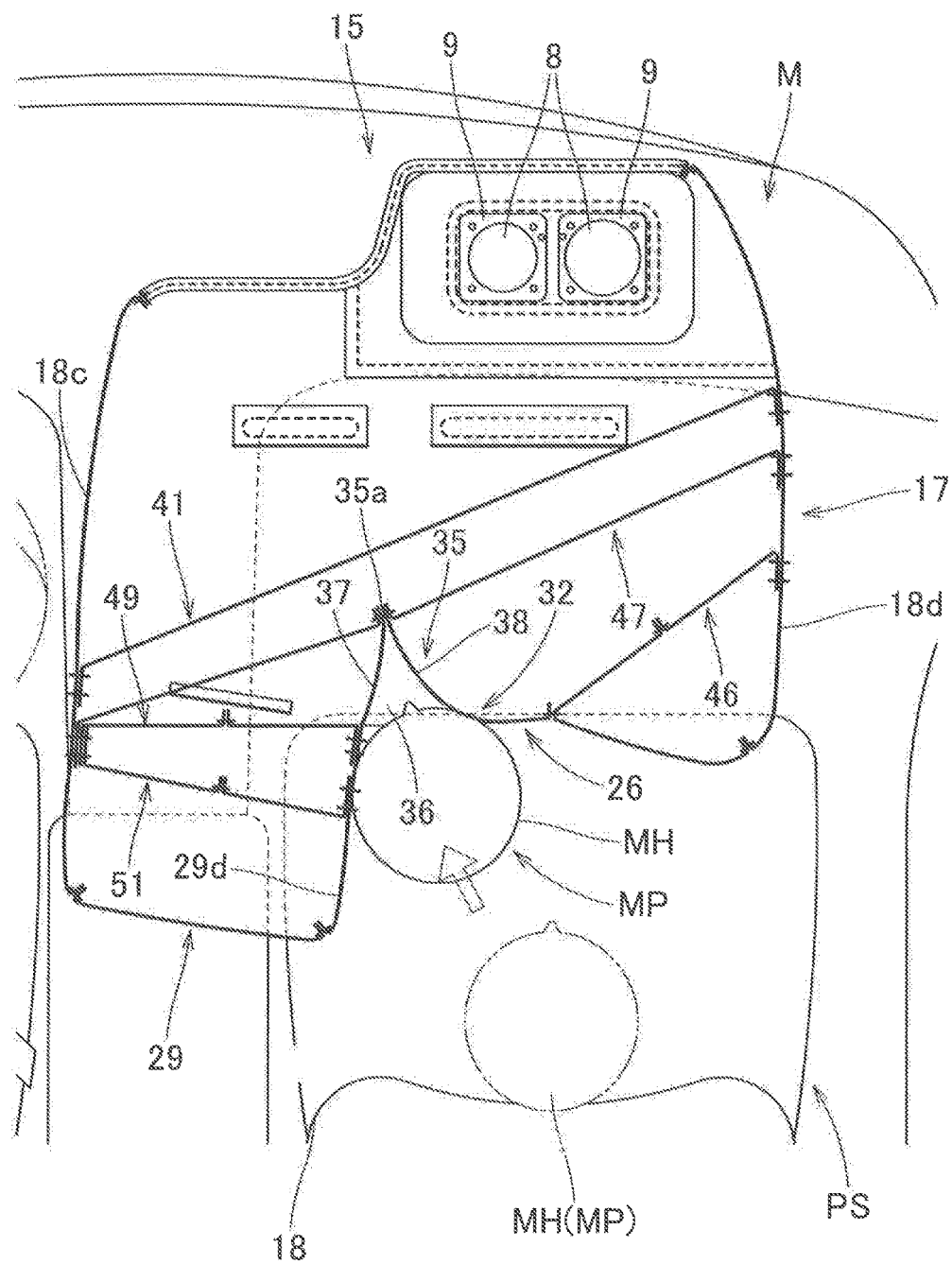
FIG. 15 is a schematic horizontal sectional view of the airbag device as the airbag cushions a passenger who has moved diagonally forward.

As shown in FIG. 8, the left-right tether 41 connects a generally center in a front and rear direction of the right side wall 18d and a vicinity of the rear end of the left side wall 18c of the main inflatable region 17 and is arranged at a slant relative to a left and right direction. That is, at airbag deployment, the left-right tether 41 is deployed at a slant relative to a left and right direction such that the left end 41a is disposed at a rear side while the right end 41b is disposed at a front side. The oblique arrangement is determined based on a moving direction of a passenger MP who would move diagonally forward in the event of an oblique or an offset collision. In the illustrated embodiment, as shown in FIG. 15, the left-right tether 41 is arranged generally perpendicularly toward a direction in which the passenger MP would move. The left-right tether 41 is formed by joining together two pieces of base cloths 42L and 42R which are disposed side by side in a left and right direction. The left-right tether 41 regulates a clearance between the left side wall 18c and right side wall 18d of the main inflatable region 17 for regulating an outer contour of the main inflatable region 17 as deployed as well as prevents the main inflatable region 17 from being deformed due to increased distance between the walls 18c and 18d when the passenger protection portion 32 cushions the passenger MP.

As shown in FIG. 8, the two up-down tethers 43 and 44 are disposed side by side in a left and right direction at the same position in a front and rear direction inside the main inflatable region 17. The up-down tethers 43 and 44 connect the upper wall 18a and lower wall 18b of the main inflatable region 17 and are arranged generally along an up and down direction in front of the left-right tether 41 as shown in FIG. 7. Each of the up-down tethers 43 and 44 is formed by joining together two pieces of base cloths 43a and 43b/44a and 44b each of which are disposed one above the other. More specifically, the up-down tether 44 disposed on the right side is located at the rear of the gas inlet ports 21 and the up-down tether 43 located on the left side has a slightly smaller width in a left and right direction than the up-down tether 44. The up-down tethers 43 and 44 regulate a clearance between the upper wall 18a and lower wall 18b of the main inflatable region 17 for regulating the outer contour of the main inflatable region 17 as deployed.

Referring to FIGS. 9 and 10, the regulating tether 45 is arranged generally along an up and down direction in a vicinity of the communication portion 30 in the protruding inflatable region 29 at a position corresponding to a generally center in a left and right direction of the communication portion 30. Specifically, the regulating tether 45 connects vicinities of front edges of the upper wall 29a and lower wall 29b of the protruding inflatable region 29. The regulating tether 45 is a generally band in outer contour and is formed by joining together two pieces of base cloths 45a and 45b which are disposed one above the other as shown in FIG. 7. The regulating tether 45 regulates a clearance between the upper wall 29a and lower wall 29b in the vicinity of the boundary region between the protruding inflatable region 29 and main inflatable region 17 (i.e., in a vicinity of the communication portion 30) in the protruding inflatable region 29 for regulating an outer contour of the protruding inflatable region 29 as deployed.

Referring to FIG. 8, the regulating tether 46 disposed in the passenger protection portion 32 of the main inflatable region 17 connects a portion of the rear wall 26 on the center line CL running through the mounting center C and a vicinity of the rear end of the right side wall 18d and is disposed at a slant relative to a left and right direction. The regulating tether 46 is a band broader than the left-right 5 tether 41, and is formed by joining together a base cloth 46a and an extended region 70 extending from an inner circumferential edge (left edge 69c) of a later-described rear right panel 69, which forms the rear wall 26 of the main inflatable region 17. The regulating tether 46 prevents a central region of the rear wall 26 from protruding rearward (towards the 10 passenger MP) considerably at airbag deployment and regulates an outer contour of the passenger protection portion 32 as deployed.

Referring also to FIG. 8, the regulating tether 47 is arranged generally along a left and right direction between the left-right tether 41 disposed inside the main inflatable region 17 and the regulating ether 45 disposed in the vicinity of the communication portion 30 in the protruding inflatable region 29. In the illustrated embodiment, the right end 47b of the regulating tether 47 is jointed to a generally center in a front and rear direction of the right side wall 18d of the main inflatable region 17 while the left end 47a is jointed to the left side wall 18c of the main inflatable region 17 in a vicinity of the boundary region between the main inflatable region 17 and protruding inflatable region 29. The regulating tether 47 is arranged at a slant relative to a left and right direction generally along the left-right tether 41. The front end 35a of the arresting recess 35 is jointed to the regulating tether 47 at a position slightly to the left from the center in a left and right direction of the regulating tether 47. More specifically, the regulating tether 47 is formed by joining together base cloths 48L, and 48R which are disposed side by side in a left and right direction as shown in FIG. 8, and the front end 35a of the arresting recess 35 is sewn together with terminals of the base cloths 48L and 48R when the terminals are sewn together, thus the front end 35a of the arresting recess 35 is jointed with the regulating tether 47. Joined to the leading end (front end or bottom 35a) of the arresting recess 35, the regulating tether 47 prevents the arresting recess 35 from moving rearward at airbag deployment. More specifically, the regulating tether 47 has a width in an up and down dimension greater than that of the front end 35a of the arresting recess 35 such that the front end 35a of the arresting recess 35 is entirely jointed to the regulating tether 47 in an up and down direction. The left end 47a of the regulating tether 47 is sewn to a vicinity of the boundary between the main inflatable region 17 and protruding inflatable region 29 together with the left ends 49a and 51a of the left-right tethers 49 and 51 disposed in the protruding inflatable region 29.

The left-right tethers 49 and 51 connect the right side wall 29d and left side wall 29c of the protruding inflatable region 29 and are disposed generally along a left and right direction, one behind the other inside the protruding inflatable region 29, as shown in FIG. 8. In the illustrated embodiment, the right end 49b of the left-right tether 49, which is disposed on the front side, is jointed to a vicinity of the front end of the right side wall 29d of the protruding inflatable region 29, which is a vicinity of the boundary between the right side wall 29d and the arresting recess 35 (i.e., a vicinity of the opening 36 of the arresting recess 35), while the left end 49a is jointed to a vicinity of the front end of the left side wall 29c, which is a vicinity of the boundary between the main inflatable region 17 and protruding inflatable region 29, thus the left-right tether 49 is deployable slightly at a slant relative to a left-right direction such that the left end 49a is located farther rearward than the right end 49b. The right end 51b of the left-right tether 51, which is located on the rear side, is jointed to a position on the right side wall 29d at the rear of the right end 49b of the left-right tether 49, while the left end 51a is jointed to the vicinity of the boundary between the main inflatable region 17 and protruding inflatable region 29, together with the left end 49a of the left-right tether 49, such that the left-right tether 51 is deployable generally along a left and right direction at airbag deployment. Each of the left-right tethers 49 and 51 is formed by joining together two pieces of base cloths 50L and 50R/52L and 52R each of which are disposed side by side in a left and right direction. These left-right tethers 49 and 51 regulate a clearance between the left side wall 29c and right side wall 29d of the protruding inflatable region 29 and control in combination an outer contour of the protruding inflatable region 29 as deployed. More specifically, as shown in FIG. 11, each of the left-right tethers 49 and 51 is so arranged that the width direction extends generally along an up and down direction and the right ends 49b and 51b are jointed at separate positions in a front and rear direction on the right side wall 29d of the protruding inflatable region 29, and therefore, the left-right tethers 49 and 51 are capable of regulating an extensive range in front-rear and up-down directions of a front end region of the right side wall 29d of the protruding inflatable region 29, and deploying the right side wall 29d to form the oblique-collision arresting plane 34 generally along a front and rear direction.

As shown in FIG. 8, the jointing member 54 extends from a left front region of the main inflatable region 17 (bag body 16) as inflated for jointing the front end region of the bag body 16 to a vicinity of the case 12. The jointing member 54 includes a vertical portion 55 extending from the left front region of the main inflatable region 17 and a horizontal portion 56 extending generally in a left and right direction towards the right from the front end of the vertical portion 55. The leading end (right end) 56a region of the horizontal portion 56 is secured to the case 12 together with the mounting section 20 of the airbag 15 with the aid of the left retainer 9 for attaching the airbag 15 to the case 12. The jointing member 54 helps steady the deployment of the airbag 15 (bag body 16) which protrudes considerably toward the rear and left out of the case 12.

Figure 12:
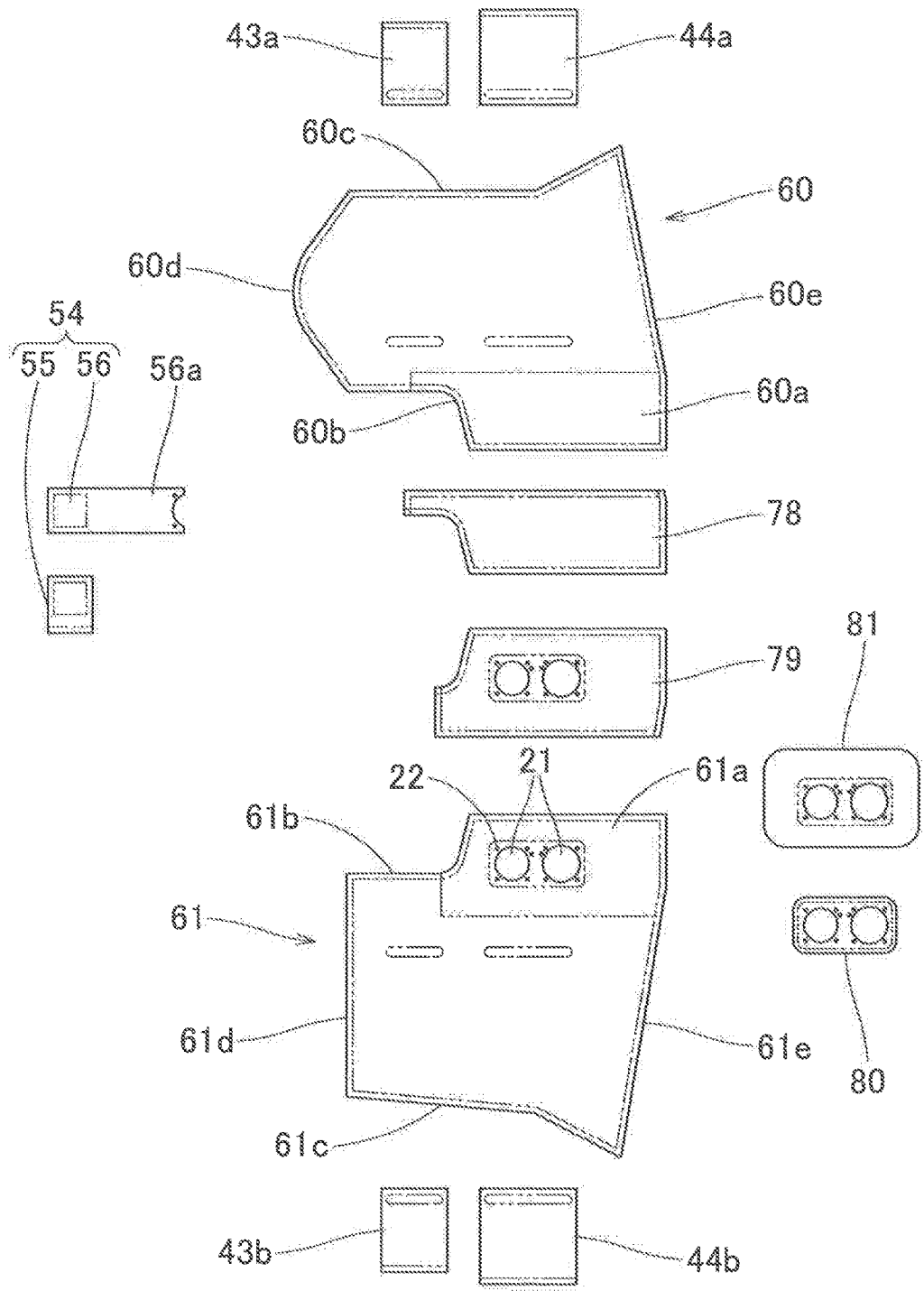
FIGS. 12 and 13 show base cloths of the airbag of FIG. 3 by plan views.
Figure 13:
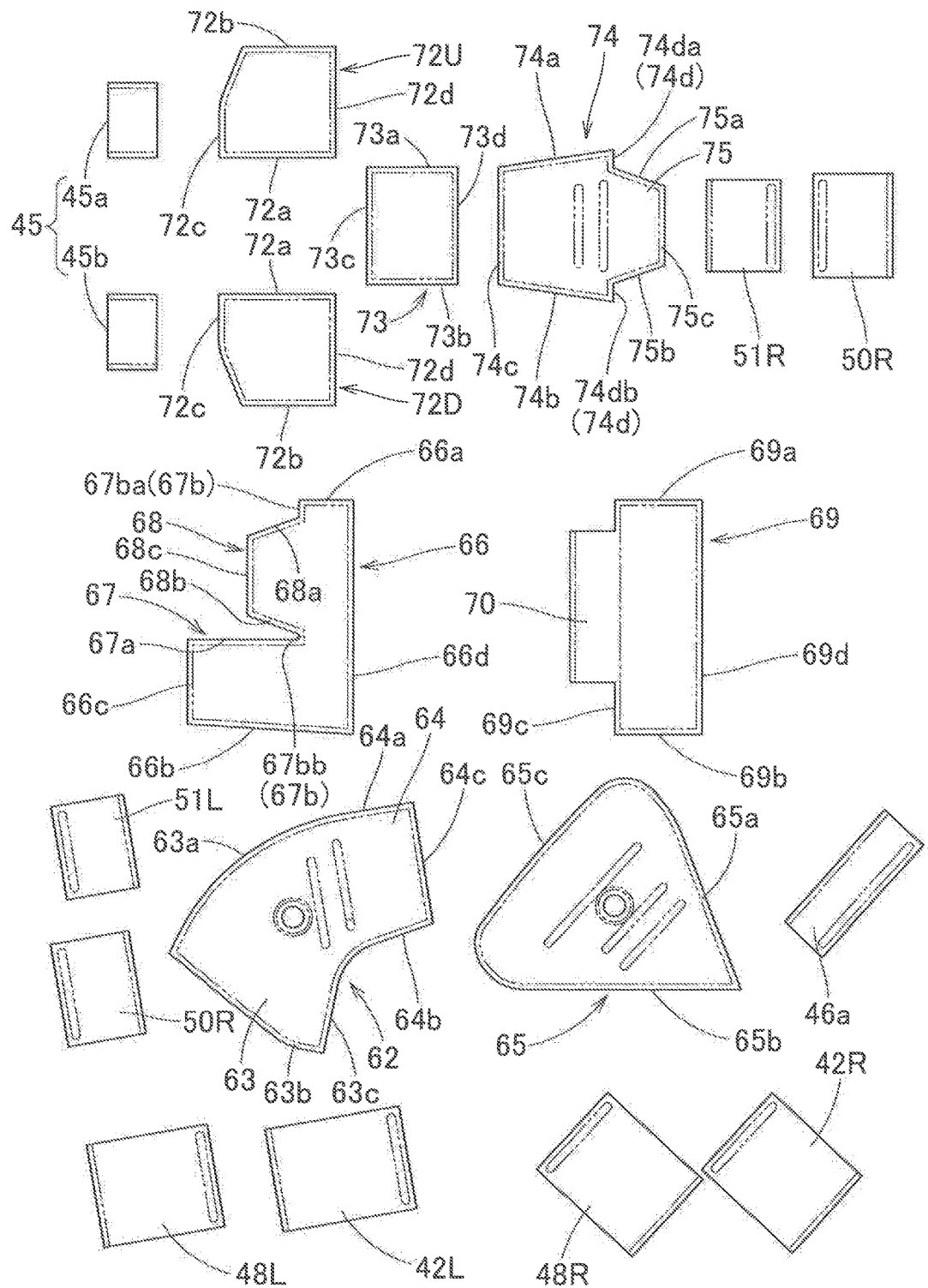

The bag body 16 is formed into a bag by sewing together circumferential edges of predetermined shaped base cloths. As shown in FIGS. 12 and 13, the bag body 16 of this specific embodiment is composed of ten base cloths: an upper panel 60 deployable on the upper side, a lower panel 61 deployable on the lower side, a left panel 62 deployable on the left side, a right panel 65 deployable on the right side, a rear left panel 66 and a rear right panel 69 deployable on the rear side, a second upper panel 72U which constitutes the upper region of the protruding inflatable region 29, a second lower panel 72D which constitutes the lower region of the protruding inflatable region 29, a second rear panel 73 which constitutes the rear region of the protruding inflatable region 29, a second right panel 74 which constitutes the right region of the protruding inflatable region 29; and two pieces of reinforcing cloths 78 and 79 for reinforcing the mounting section 20 of the bag body 16.

The upper panel 60 constitutes the upper wall 18a while the lower panel 61 constitutes the lower wall 18b, of the main inflatable region 17. Each of the upper panel 60 and lower panel 61 is generally rectangular in shape, and is provided with a protruding region 60a/61a for forming the mounting section 20.

The left panel 62 constitutes the left side wall 18c of the main inflatable region 17 and the left side wall 29c of the protruding inflatable region 29. As shown in FIG. 13, the left panel 62 has such a contour that a generally triangular main body 63 for forming the left side wall 18c of the main inflatable region 17 and a generally rectangular protruding region 64 for forming the left side wall 29c of the protruding inflatable region 29 are connected. The right panel 65 constitutes the right side wall 18d of the main inflatable region 17, and is generally triangular in outer contour.

The rear left panel 66 and rear right panel 69 each constitute the left and right regions 26a and 26b of the rear wall 26 of the main inflatable region 17. Specifically, the rear left panel 66 forms the left region 26a of the rear wall 26 which is disposed on the left side of the center line CL running through the mounting center C and extending generally along a front and rear direction while the rear right panel 69 forms the right region 26b of the rear wall 26 which is disposed on the right side of the center line CL. The rear left panel 66 has such a contour that the left upper region is cut out for providing communication between the main inflatable region 17 and protruding inflatable region 29. A flap-like portion 68 is disposed in this cut-out region 67 for forming the right side wall 38 of the arresting recess 35 (FIG. 13). More specifically, the flap-like portion 68 is formed into a generally trapezoid narrowing toward the front edge 68c to be deployed at the front at airbag deployment, and protrudes towards the left from the right edge of the cut-out region 67 in a flattened state of the rear left panel 66. Even more particularly, the width in an up and down direction of the flap-like portion 68 is slightly smaller than that of the cut-out region 67 (i.e., the length of the right edge 67b), while the center in an up and down direction of the flap-like portion 68 generally coincides with the center in an up and down direction of the cut-out region 67. That is, the right edge 67b of the cut-out region 67 includes an upper region 67ba and a lower region 67bb extending upward and downward from the flap-like portion 68. Each of the upper region 67ba and the lower region 67bb is to be joined (sewn) together with later-described upper region 74da and lower region 74db of a front edge 74d of the second right panel 74. Vicinities of seams of the regions 67ba and 74da and regions 67bb and 74db (i.e., regions in vicinities of the protruding regions 29f and 29g of the protruding inflatable region 29) constitute the joint region 39 that connects the front-collision arresting plane 33 and oblique-collision arresting plane 34 in vicinities of the upper end 35c and lower end 35d of the arresting recess 35 (FIG. 10). The rear right panel 69 includes at the left edge 69c (at the inner circumferential edge) an extended region 70 for forming the regulating tether 46.

The second upper panel 72U constitutes the upper wall 29a while the second lower panel 72D constitutes the lower wall 29b, of the protruding inflatable region 29. The second upper panel 72U and second lower panel 72D have a generally identical, trapezoidal contour in which the left edge 72c narrows toward the rear edge 72b. The right edge 72d of each of the second upper panel 72U and second lower panel 72D is generally perpendicular to the front edge 72a.

The second rear panel 73 forms the rear wall 29e of the protruding inflatable region 29 and is generally rectangular in outer contour.

The second right panel 74 constitutes the right side wall 29d of the protruding inflatable region 29, and has a generally trapezoidal contour slightly narrowing toward the rear edge 74c. The second right panel 74 includes at the front edge 74d a flap-like portion 75 for forming the left side wall 37 of the arresting recess 35. The flap-like portion 75 is formed into a generally trapezoid narrowing toward the front edge 75c, and protrudes out of the front edge 74d of the second right panel 74. The flap-like portion 75 is generally identical in outer contour to the flap-like portion 68 of the rear left panel 66, as shown in FIG. 13. More particularly, the width in an up and down direction of the flap-like portion 75 is slightly smaller than that of the front edge 74d of the second right panel 74, while the center in an up and down direction of the flap-like portion 75 generally coincides with the center in an up and down direction of the second right panel 74. The front edge 74d of the second right panel 74 is also provided with an upper region 74da and lower region 74db extending upward and downward from the flap-like portion 75. As described above, the upper region 74da and lower region 74db are to be jointed with the upper region 67ba and lower region 67bb of the cut-out region 67 of the rear left panel 66.

Each of the reinforcing cloths 78 and 79 is formed into a generally rectangular shape corresponding to the protruding regions 60a and 61a of the upper panel 60 and lower panel 61 and is used to reinforce the mounting section 20 of the bag body 16.

In the illustrated embodiment, the upper panel 60, the lower panel 61, the left panel 62, the right panel 65, the rear left panel 66, the rear right panel 69, the second upper panel 72U, the second lower panel 72D, the second rear panel 73, the second right panel 74, the reinforcing cloths 78 and 79, the base cloths 42L and 42R forming the left-right tether 41, the base cloths 43a and 43b forming the up-down tether 43, the base cloths 44a and 44b forming the up-down tether 44, the base cloths 45a and 45b forming the regulating tether 45, the base cloth 46a forming the regulating tether 46, the base cloths 48L and 48R forming the regulating tether 47, the base cloths 50L and 50R forming the left-right tether 49, the base cloths 52L and 52R forming the left-right tether 51, and the vertical portion 55 and horizontal portion 56 of the jointing member 54 are made of a flexible woven fabric of polyester yarn, polyamide yarn or the like.

The bag body 16 is formed into a bag by joining corresponding edges of the upper panel 60, the lower panel 61, the left panel 62, the right panel 65, the rear left panel 66, the rear right panel 69, the second upper panel 72U, the second lower panel 72D, the second rear panel 73, the second right panel 74 with sewing threads, as shown in FIGS. 6 to 10, 12 and 13. Specifically, the front edge 60b of the upper panel 60 is joined with the front edge 61b of the lower panel 61, and the rear edge 60c of the upper panel 60 is joined with the front edge 72a of the second upper panel 72U, the upper edge 66a of the rear left panel 66 and the upper edge 69a of the rear right panel 69. The left edge 60d of the upper panel 60 is joined with the upper edge 63a of the main body 63 of the left panel 62, and the right edge 60e of the upper panel 60 is joined with the upper edge 65a of the right panel 65. The rear edge 61c of the lower panel 61 is joined with the lower edge 66b of the rear left panel 66 and lower edge 69b of the rear right panel 69, and the left edge 61d of the lower panel 61 is joined with the lower edge 63b of the main body 63 of the left panel 62, and the right edge 61e of the lower panel 61 is joined with the lower edge 65b of the right panel 65. The rear edge 63c of the main body 63 of the left panel 62 is joined with the left edge 66c of the rear left panel 66. The upper edge 64a and lower edge 64b of the protruding region 64 of the left panel 62 are each joined with the left edge 72c of each of the second upper panel 72U and second lower panel 72D, and the rear edge 64c of the protruding region 64 is joined with the left edge 73c of the second rear panel 73. The rear edge 65c of the right panel 65 is joined with the right edge 69d of the rear right panel 69. The right edge 66d of the rear left panel 66 is joined with the left edge 69c of the rear right panel 69. The lower edge 67a of the cut-out region 67 of the rear left panel 66 is joined with the front edge 72a of the second lower panel 72D. The upper region 67ba and lower region 67bb of the right edge 67b of the cut-out region 67 in the rear left panel 66 is each joined with the upper region 74da and lower region 74db of the front edge 74d of the second right panel 74. The upper edge 68a, lower edge 68b and front edge 68c of the flap-like portion 68 of the rear left panel 66 are each joined with the upper edge 75a, lower edge 75b and front edge 75c of the flap-like portion 75 of the second right panel 74. The rear edges 72b of the second upper panel 72U and second lower panel 72D are each joined with the upper edge 73a and lower edge 73b of the second rear panel 73. The right edges 72d of the second upper panel 72U and second lower panel 72D are each joined with the upper edge 74a and lower edge 74b of the second right panel 74. The right edge 73d of the second rear panel 73 is joined with the rear edge 74c of the second right panel 74.

The steering wheel 83 located in front of the driver's seat DS, which is on the left of the front passenger seat PS, is provided with an airbag device 86 for a steering wheel. The airbag device 86 includes an airbag 87 for a steering wheel which is stored in a boss section 84 disposed at the center of the steering wheel 83 in an folded-up configuration, and an inflator (not-shown) for feeding the airbag 87 with inflation gas. The airbag 87 is fabricated of a flexible sheet material and inflatable with an inflation gas fed from the inflator to cover the top plane (i.e., rear plane) of the steering wheel 83 entirely as shown in FIG. 16. In a similar fashion to the inflators 8 of the airbag device M for a front passenger seat, the inflator of the airbag device 86 for a steering wheel is designed to be actuated in the event of a frontal collision, an oblique collision and an offset collision of the vehicle V.

Mounting of the airbag device M for a front passenger seat on the vehicle V is now described. Firstly, the retainers 9 are housed inside the airbag 15, and the airbag 15 is folded up. Then a breakable wrapping sheet (not shown) is wrapped around the airbag 15 for keeping the folded-up configuration. Subsequently, the airbag 15 is placed on the bottom wall 12a of the case 12. Then the main bodies 8a of the inflators 8 are set in the case 12 from the underside of the bottom wall 12a such that the bolts 9a of the retainers 9 projecting downward out of the bottom wall 12a penetrate the flanges 8c of the inflators 8. If then nuts 10 are used to fasten the bolts 9a of the retainers 9 projecting downward out of the flanges 8c of the inflators 8, the airbag 15 and the inflators 8 are mounted on the case 12.

Thereafter, the circumferential wall 12b of the case 12 is attached to the joint wall 6c of the airbag cover 6 on the dashboard 1, which has been mounted on board, and the unillustrated bracket of the case 12 is secured to the vehicle body structure. Thus the airbag device M is mounted on the vehicle V.

After the airbag device M for a front passenger seat of the foregoing embodiment is mounted on the vehicle V, in the event of a frontal collision, an oblique collision or an offset collision of the vehicle V, the inflators 8 discharge an inflation gas from the gas discharge ports 8b to inflate the airbag 15. Then the airbag 15 pushes and opens the doors 6a and 6b of the airbag cover 6, protrudes out of the case 12 via an opening formed by the opening of the doors 6a and 6b, and is deployed upward and rearward in such a manner as to fill up a space between the top plane 2 of the dashboard 1 and the windshield 4, as shown in FIGS. 14 and 15. At the same time, the airbag 87 for the steering wheel 83 is also inflated with an inflation gas and is deployed over the top plane (i.e., rear plane) of the steering wheel 83 (FIG. 15).

In the airbag device M of the foregoing embodiment, the passenger protection portion 32 includes the front-collision arresting plane 33 and the oblique-collision arresting plane 34 protruding rearward out of the front-collision arresting plane 33. The passenger protection portion 32 further includes the arresting recess 35 for receiving and arresting the passenger's head MH, and the arresting recess 35 is sunken forward between the front-collision arresting plane 33 and oblique-collision arresting plane 34. Accordingly, in the event of an oblique collision or offset collision of the vehicle V, the airbag 15 is able to arrest the passenger's head MH by guiding the head MH by the oblique-collision arresting plane 33 into the arresting recess 35 as he moves diagonally forward, as shown in FIGS. 15 and 16. At this time, at least a part of the passenger's head MH will thrust itself into the arresting recess 35 while opening the recess 35 toward the left and right, such that the front and laterals of the head MH will be cushioned by a wide arresting plane composed of inner surfaces of the arresting recess 35 opposed in a left and right direction (i.e., the left side wall 37 and right side wall 38). Moreover, since the arresting recess 35 will contact both laterals of the head MH by the left side wall 37 and right side wall 38, it will not turn the head MH in a left and right direction when cushioning the head MH. As a consequence, the airbag device M of the foregoing embodiment will cushion the passenger's head MH in a smooth fashion with the arresting recess 35.

Therefore, the airbag device M for a front passenger seat of the foregoing embodiment will protect the front seat passenger MP with the airbag 15 in a smooth fashion as he moves diagonally forward. Moreover, the airbag device M will cushion the head MH of the passenger MP with the front-collision arresting plane 33 in the event of a frontal collision of the vehicle V as well.

In the airbag device M, moreover, the passenger protection portion 32 further includes the joint regions 39 that are formed in a vicinity of each of the upper end 35c and lower end 35d of the arresting recess 35 and connect the front-collision arresting plane 33 and oblique-collision arresting plane 34 together. In other words, the joint regions 39 close off the upper end 35c and lower end 35d of the arresting recess 35 so the arresting recess 35 is open only at the rear end 35b. Therefore, the joint regions 39 will prevent the rear end 35b of the arresting recess 35 from gaping open at airbag deployment and enable the arresting recess 35 to cushion the head MH in a receiving fashion while absorbing its kinetic energy in an adequate fashion. If such an advantageous effect does not have to be considered, the arresting recess may be formed into a generally gap extending in an up and down direction and opening to the upper end and lower end.

In the airbag device M of the foregoing embodiment, the airbag 15 further includes the regulating tether 47 that is joined to the bottom (leading end or front end 35a) of the arresting recess 35 and prevents the arresting recess 35 from moving rearward at airbag deployment. The regulating tether 47 will keep the arresting recess 35 recessed at airbag deployment in an adequate fashion.

In the foregoing embodiment, especially, while the regulating tether 47 helps deploy the arresting recess 35 in such a manner as to be recessed forward at airbag deployment, the left-right tethers 49 and 51 help deploy the right side wall 29*d* of the protruding inflatable region 29 (i.e., the oblique-collision arresting plane 34) generally along a front and rear direction. Moreover, the left side wall 37 of the arresting recess 35 is composed of the same base cloth, i.e., the second right panel 74, as the right side wall 29*d* of the protruding inflatable region 29. In other words, the left side wall 37 of the arresting recess 35 is continuous with the right side wall 29*d*. With this configuration, the arresting recess 35 will be deployed in such a manner as to extend straightly forward from the right side wall 29*d* of the protruding inflatable region 29 (i.e., the oblique-collision arresting plane 34) which is deployed generally along a front and rear direction, and the rear end 35*b* (the opening 36) of the arresting recess 35 will be further prevented from gaping open at airbag deployment. That is, the arresting recess 35 will be able to keep the left side wall 37 and right side wall 38 attached together easily, and consequently, adequately absorb the kinetic energy of the passenger's head MH thrusting itself into the opening 36 by separating the left side wall 37 and right side wall 38, thus cushioning it in a smooth fashion. In order to prevent the opening 36 of the arresting recess 35 from gaping open at airbag deployment even more securely, the opening 36 of the arresting recess 35 may be sewn up by a seam of a sewing thread which is breakable when the passenger's head enters into the arresting recess.

Figure 17:
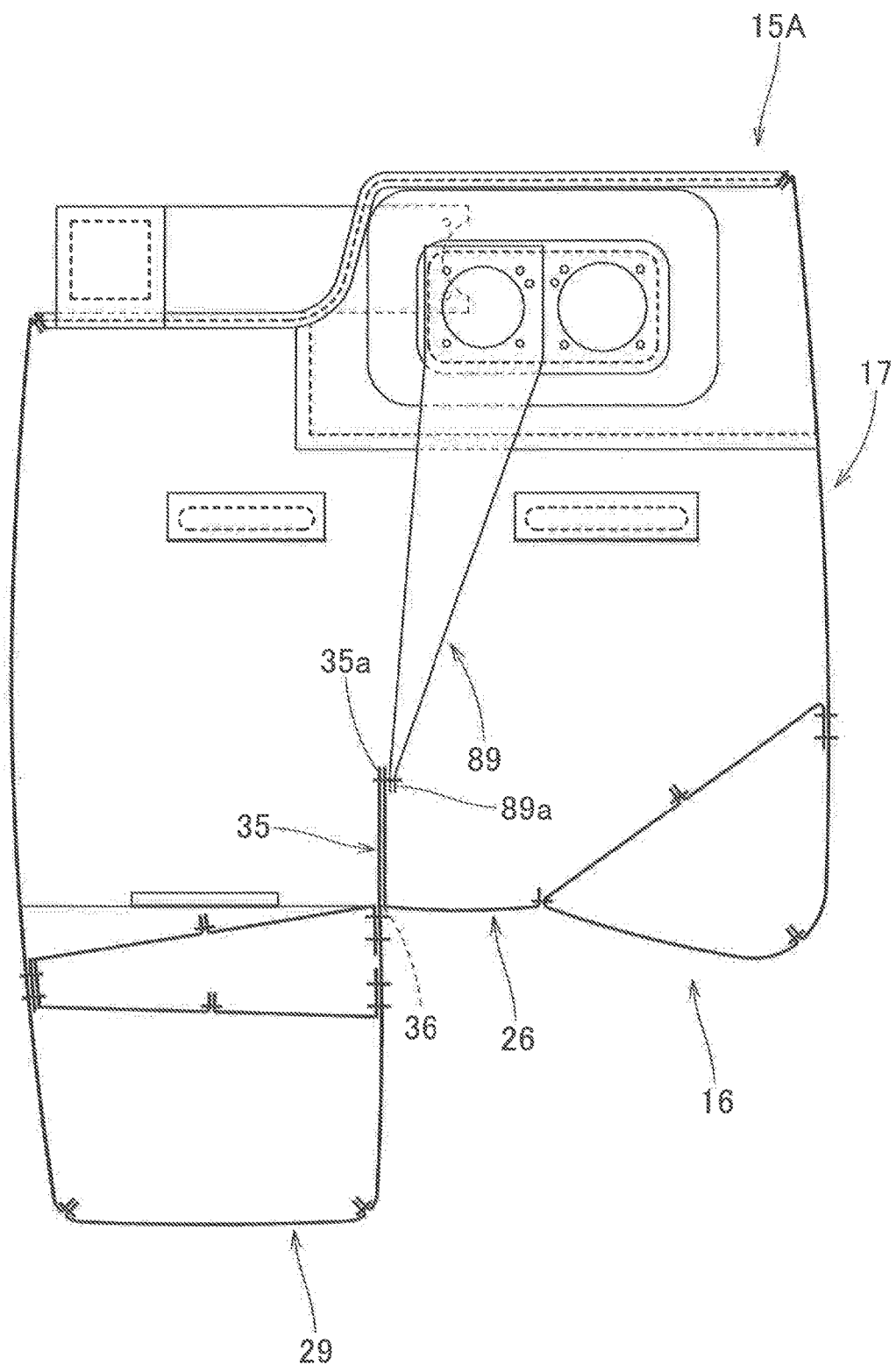
FIG. 17 is a schematic horizontal sectional view of an airbag of an alternative embodiment as fully deployed.
Figure 18:
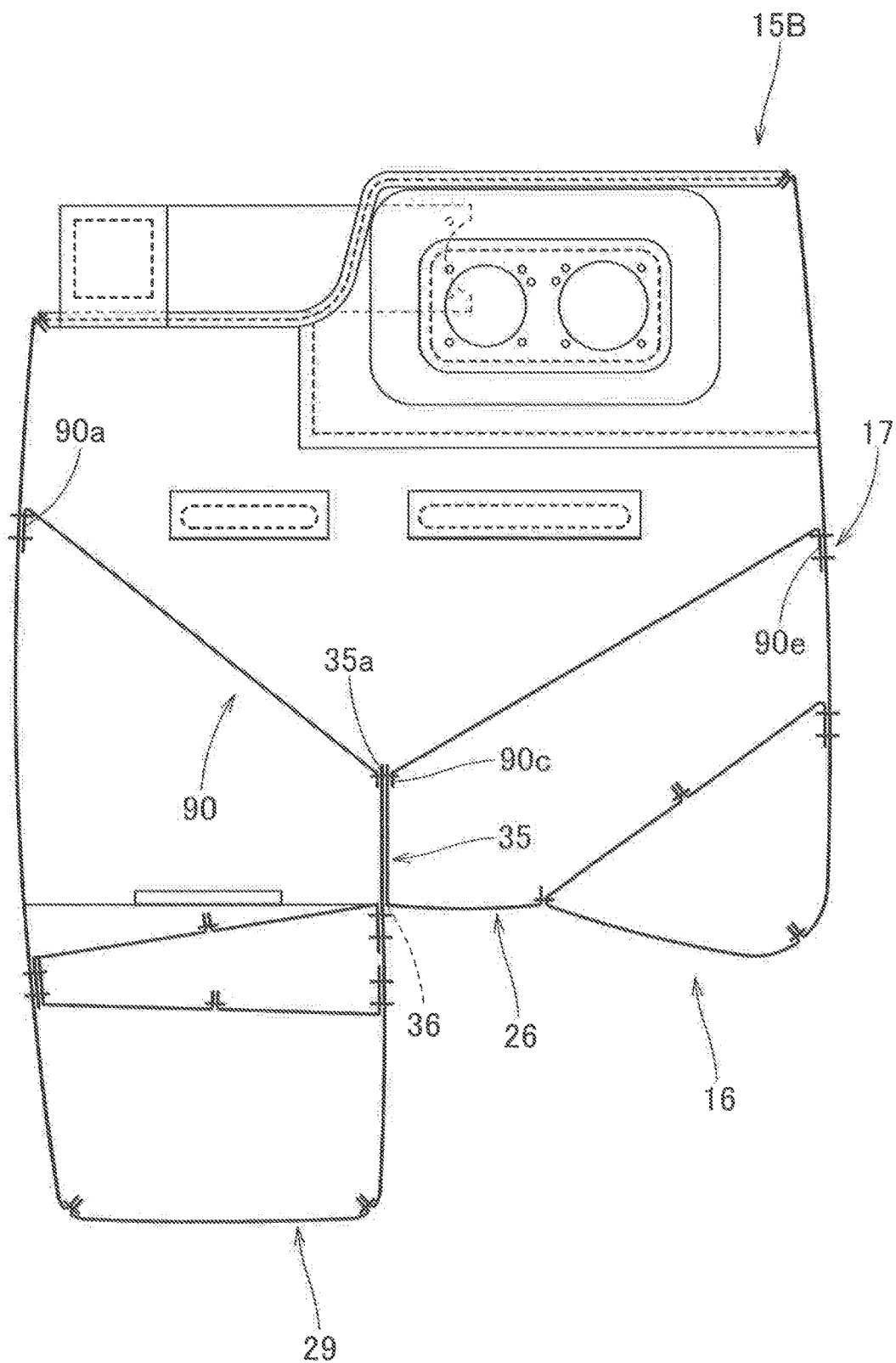
FIG. 18 is a schematic horizontal sectional view of an airbag of another alternative embodiment as fully deployed.
Figure 19:
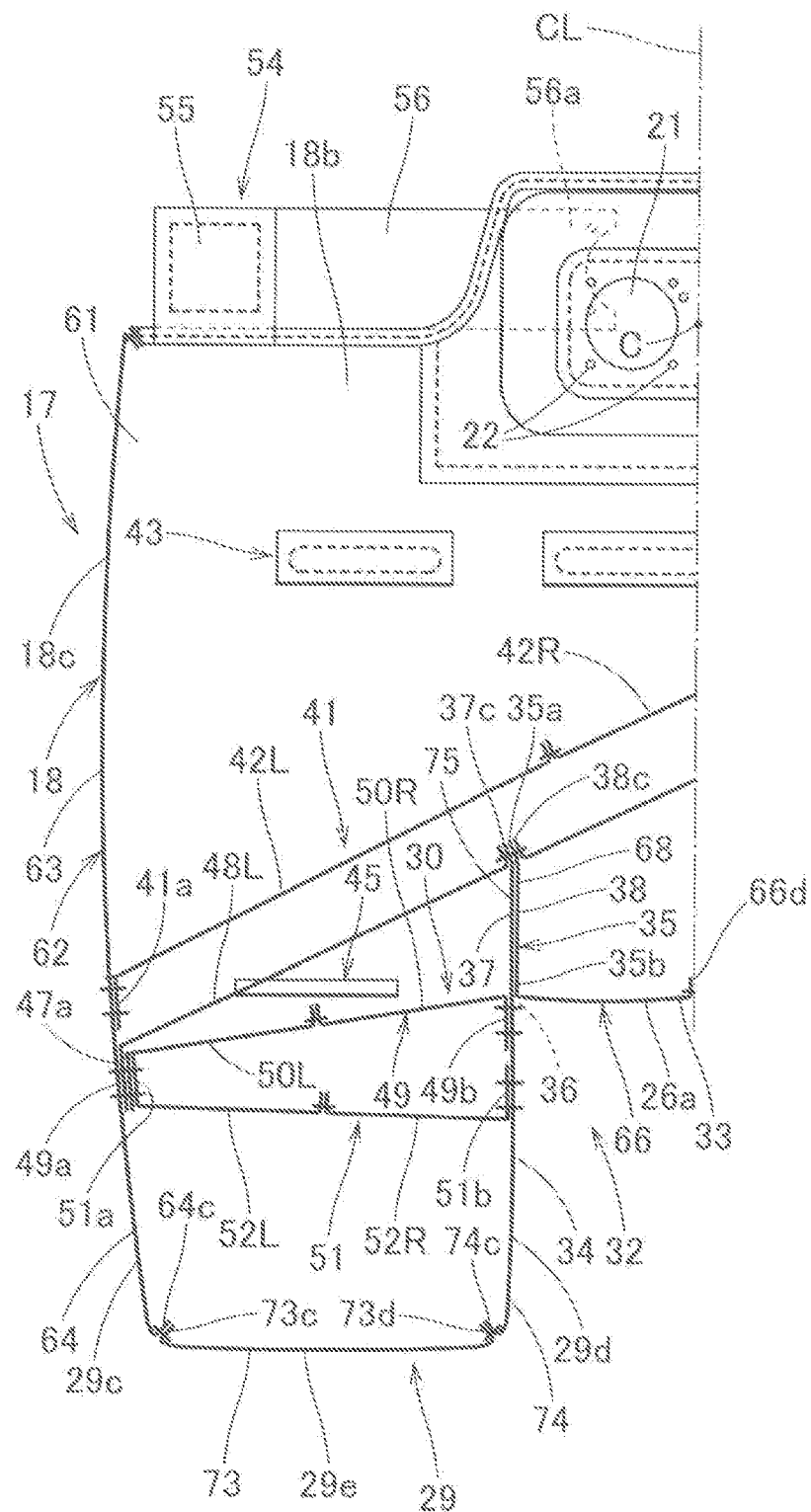
FIG. 19 is FIG. 8 left of line CL.

In the foregoing embodiment, the regulating tether 47 for pulling the bottom (leading end or front end 35*a*) of the arresting recess 35 is connected to the left side wall 18*c* and right side wall 18*d* of the bag body 16 and thus arranged generally along a left and right direction. However, the configuration of the regulating tether should not be limited thereby. By way of example, the regulating tether may be configured as shown in FIGS. 17 and 18. The regulating tether 89 of the airbag 15A shown in FIG. 17 is attached to the peripheral area of the left gas inlet port 21 with the aid of the retainer. The regulating tether 89 extends rearward from the peripheral area of the left gas inlet port 21 and is joined to the front end 35*a* of the arresting recess 35 by the rear end 89*a*. The regulating tether 90 of the airbag 15B shown in FIG. 18 is joined to the left side wall 18*c* and right side wall 18*d* by the left end 90*a* and right end 90*b*, and arranged in such a generally V shape as viewed from an up and down direction that the center 90*c* in a left and right direction is disposed at the rear and is joined to the front end 35*a* of the arresting recess 35. Although the regulating tether 47 of the foregoing embodiment is so configured that an entire leading end (front end 35*a*) of the arresting recess 35 is joined to the tether 47, it may also be so configured that the leading end of the recess is partially joined thereto on condition that the regulating tether is able to prevent the rearward movement of the arresting recess at airbag deployment.

Figure 20:
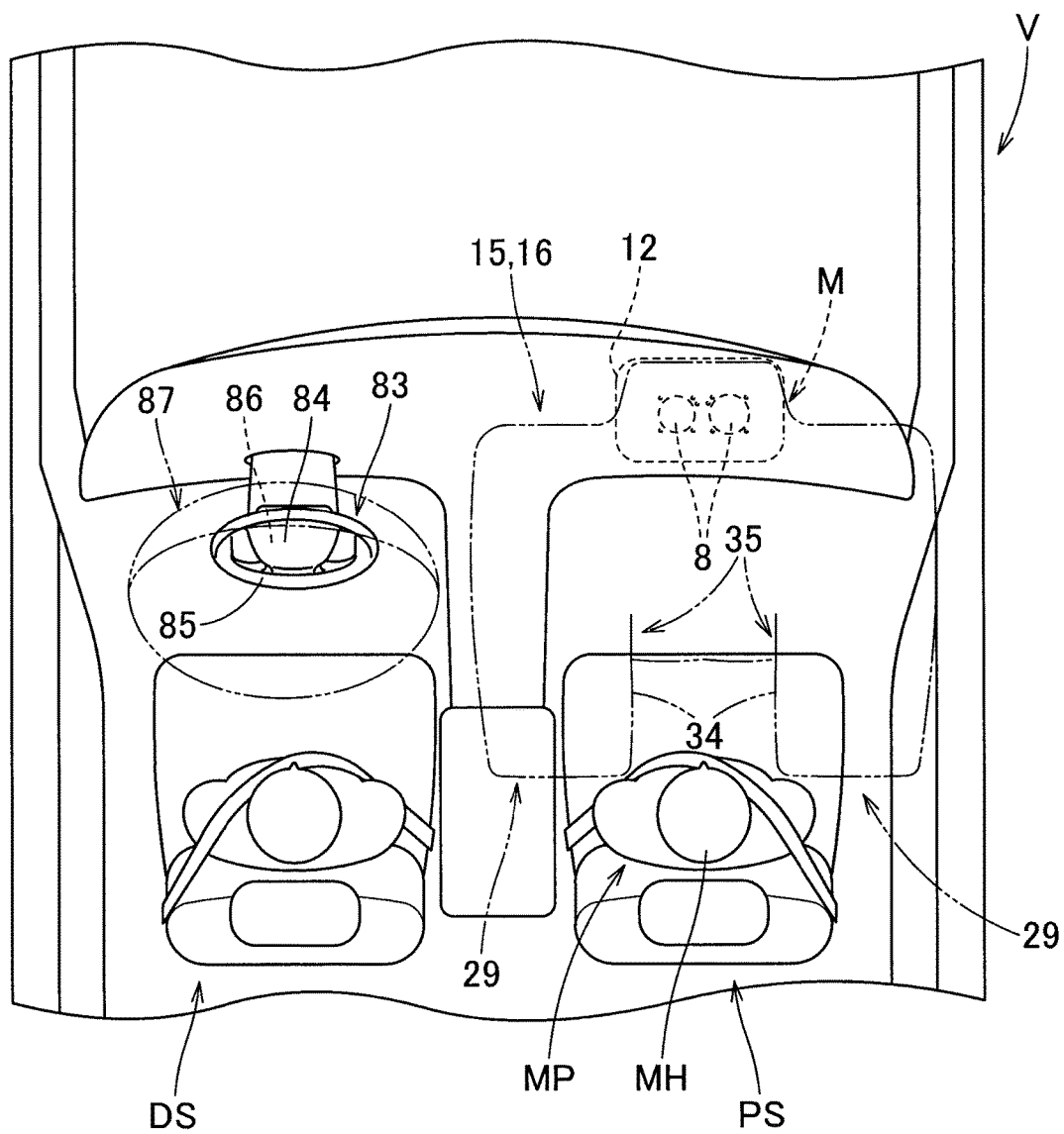
FIG. 20 is a schematic plan view of another embodiment of the airbag device.

In the airbag device M of the foregoing embodiment, the oblique-collision arresting plane 34 and arresting recess 35 are disposed on a part of the front-collision 20 arresting plane 33 deployable toward the driver's seat DS (i.e., on the left side of the front-collision arresting plane 33). With this configuration, the passenger's head MH will be protected in an adequate fashion when the front seat passenger MP moves diagonally forward and toward the center in a left and right direction of the vehicle V in the event of an oblique or an offset collision. Alternatively, however, the oblique-collision arresting plane and the arresting recess may be disposed only on the right side (outboard side), but not on the left side, of the front-collision arresting plane. Further alternatively, as illustrated in FIG. 20, the oblique-collision arresting plane and the arresting recess may be disposed on both left and right sides of the front-collision arresting plane.

What is claimed is:

1. An airbag device for a front passenger seat adapted to be mounted on an instrument panel disposed in front of the front passenger seat of a vehicle, the airbag device comprising a housing adapted to be disposed in the instrument panel and an airbag which is housed in the housing in a folded-up configuration and deployable rearward for protecting a front seat passenger when fed with an inflation gas, a rear portion of the airbag as deployed serves as a passenger protection portion for protecting the passenger, the passenger protection portion comprising:

a front-collision arresting plane that protects a head of the passenger as he moves forward in the event of a frontal collision of the vehicle;

an oblique-collision arresting plane that is disposed at least either on the left or on the right of the front-collision arresting plane in such a manner as to protrude rearward out of the front-collision arresting plane for protecting the head of the passenger as he moves diagonally forward in the event of an oblique collision or an offset collision of the vehicle; and an arresting recess that is formed into a pocket opening at the rear end for receiving and arresting the head of the passenger, the arresting recess being disposed between the front-collision arresting plane and oblique-collision arresting plane.

2. The airbag device for a front passenger seat of claim 1, wherein the passenger protection portion further comprises a joint region that is formed in a vicinity of each of upper and lower ends of the arresting recess and connects the front-collision arresting plane and oblique-collision arresting plane together.

3. The airbag device for a front passenger seat of claim 1, wherein the airbag further comprises a tether that is joined to a bottom of the arresting recess and prevents the arresting recess from moving rearward at airbag deployment.

4. The airbag device for a front passenger seat of claim 1, wherein there are a plurality of the oblique-collision arresting plane including a left oblique-collision arresting plane and a right oblique-collision arresting plane, and wherein there are a plurality of the arresting recess including a left arresting recess and a right arresting recess, the left oblique-collision arresting plane and the left arresting recess are disposed on the left side of the front-collision arresting plane, and the right oblique-collision arresting plane and the right arresting recess are disposed on the right side of the front-collision arresting plane.

5. An airbag device for a front passenger seat adapted to be mounted on an instrument panel disposed in front of the front passenger seat of a vehicle, the airbag device comprising a housing adapted to be disposed in the instrument panel and an airbag which is housed in the housing in a folded-up configuration and deployable rearward for protecting a front seat passenger when fed with an inflation gas, a rear portion of the airbag as deployed serves as a passenger protection portion for protecting the passenger, the passenger protection portion comprising:

a front-collision arresting plane that protects a head of the passenger as he moves forward in the event of a frontal collision of the vehicle;

two oblique-collision arresting planes that protrude rearward out of the front-collision arresting plane respectively on the left and right sides of the front-collision arresting plane for protecting the head of the passenger as he moves diagonally forward in the event of an oblique collision or an offset collision of the vehicle; and two arresting recesses that are disposed between the front-collision arresting plane and a respective one of the oblique-collision arresting planes in such a manner as to be sunken forward for receiving and arresting the head of the passenger, wherein the airbag further comprises two tethers that are joined respectively to a bottom of a respective one of the arresting recesses for preventing the arresting recesses from moving rearward at airbag deployment.

6. The airbag device for a front passenger seat of claim 5, wherein each of the arresting recesses is formed to extend along an up and down direction.

7. The airbag device for a front passenger seat of claim 5, wherein each of the arresting recesses is formed into a pocket opening at the rear end.

8. The airbag device for a front passenger seat of claim 5, wherein:

the airbag further comprises a main inflatable region and a protruding inflatable region that protrudes rearward out of a rear portion of the main inflatable region; and the front-collision arresting plane is composed of an upper region of a rear wall of the main inflatable region deployed at the rear portion.

9. The airbag device for a front passenger seat of claim 8, wherein the airbag further comprises a regulating tether that prevents a central region of the rear wall from protruding rearward at airbag deployment.

* * * * *